US007752265B2

(12) United States Patent
Svendsen et al.

(10) Patent No.: US 7,752,265 B2
(45) Date of Patent: Jul. 6, 2010

(54) SOURCE INDICATORS FOR ELEMENTS OF AN AGGREGATE MEDIA COLLECTION IN A MEDIA SHARING SYSTEM

(75) Inventors: Hugh Svendsen, Chapel Hill, NC (US); Harold Sutherland, San Jose, CA (US); Scott Curtis, Durham, NC (US); Christopher M. Amidon, Apex, NC (US)

(73) Assignee: Eloy Technology, LLC, Wilmington, DE (US)

( * ) Notice: Subject to any disclaimer, the term of this patent is extended or adjusted under 35 U.S.C. 154(b) by 148 days.

(21) Appl. No.: 12/251,490

(22) Filed: Oct. 15, 2008

(65) Prior Publication Data

US 2010/0094934 A1 Apr. 15, 2010

(51) Int. Cl.
*G06F 15/16* (2006.01)
*G06F 15/173* (2006.01)

(52) U.S. Cl. .................. 709/205; 709/217; 709/226; 709/229; 709/231

(58) Field of Classification Search .................. 709/205, 709/217, 226, 229, 231; 715/716, 721, 790; 345/169
See application file for complete search history.

(56) References Cited

U.S. PATENT DOCUMENTS

| | | | | |
|---|---|---|---|---|
| 6,633,903 | B1 * | 10/2003 | Gould | 709/205 |
| 6,714,215 | B1 * | 3/2004 | Flora et al. | 715/716 |
| 6,907,458 | B2 | 6/2005 | Tomassetti et al. | |
| 6,953,886 | B1 | 10/2005 | Looney et al. | |
| 6,987,221 | B2 | 1/2006 | Platt | |

(Continued)

FOREIGN PATENT DOCUMENTS

WO 2007092053 A1 8/2007

(Continued)

OTHER PUBLICATIONS

Yufeng Dou et al., "An Approach to Analyzing Correlation between Songs/Artists Using iTMS Playlists," Proceedings of the International Conference on Computational Intelligence for Modelling, Control and Automation and International Conference on Intelligent Agents, Web Technologies and Internet Commerce vol-1 (CIMCA-IAWTIC'06), vol. 1, pp. 951-956, 2005, 1 page.

(Continued)

*Primary Examiner*—Quang N. Nguyen
(74) *Attorney, Agent, or Firm*—Withrow & Terranova, PLLC

(57) ABSTRACT

A system and method are disclosed for providing source indicators for one or more elements of an aggregate media collection of a user in a media sharing system. In one embodiment, a local media collection of a user is aggregated with one or more shared media collections hosted by corresponding user devices of other users participating in the media sharing system to provide an aggregate media collection for the user. Via a Graphical User Interface (GUI), for each element of at least a subset of elements of the aggregate media collection, one or more source indicators are presented in association with the element to identify a source or sources of the element in the media sharing system. The elements of the aggregate media collection include at least a subset of media items in the aggregate media collection, playlists including media items from the aggregate media collection, or both.

17 Claims, 24 Drawing Sheets

U.S. PATENT DOCUMENTS

| | | |
|---|---|---|
| 7,313,571 B1 | 12/2007 | Platt et al. |
| 7,333,092 B2 * | 2/2008 | Zadesky et al. .............. 345/169 |
| 2003/0032419 A1 | 2/2003 | Shibasaki et al. |
| 2005/0154608 A1 | 7/2005 | Paulson et al. |
| 2006/0044466 A1 | 3/2006 | Kelly et al. |
| 2006/0069998 A1 * | 3/2006 | Artman et al. .............. 715/721 |
| 2006/0143236 A1 | 6/2006 | Wu |
| 2006/0179078 A1 | 8/2006 | McLean |
| 2006/0195515 A1 | 8/2006 | Beaupre et al. |
| 2006/0195902 A1 | 8/2006 | King et al. |
| 2007/0061416 A1 * | 3/2007 | Gould ........................ 709/217 |
| 2007/0083556 A1 | 4/2007 | Plastina et al. |
| 2007/0220081 A1 | 9/2007 | Hyman |
| 2007/0244880 A1 | 10/2007 | Martin et al. |
| 2007/0282949 A1 | 12/2007 | Fischer et al. |
| 2008/0005179 A1 | 1/2008 | Friedman et al. |
| 2008/0016205 A1 | 1/2008 | Svendsen |
| 2008/0052371 A1 | 2/2008 | Partovi et al. |
| 2008/0091717 A1 | 4/2008 | Garbow et al. |
| 2008/0154967 A1 | 6/2008 | Heikes et al. |
| 2008/0205205 A1 * | 8/2008 | Chiang et al. ............ 369/30.04 |
| 2009/0083117 A1 | 3/2009 | Svendsen et al. |
| 2009/0164199 A1 * | 6/2009 | Amidon et al. ................ 703/17 |
| 2009/0177654 A1 | 7/2009 | Beaupre et al. |
| 2010/0107117 A1 * | 4/2010 | Pearce et al. ................. 715/790 |

FOREIGN PATENT DOCUMENTS

| | | |
|---|---|---|
| WO | 2007137626 A1 | 12/2007 |

OTHER PUBLICATIONS

"Firefly Media Server :: Home Page," http://www.fireflymediaserver.org/, printed Feb. 3, 2009, 1 page.

"Apple—iTunes—What is iTunes?—A player, a store, and more," http://www.apple.com/itunes/whatis/, printed Aug. 11, 2009, 2 pages.

* cited by examiner

| Cache | | Title | Artist | Album | Genre | Year | Play Count | Score |
|---|---|---|---|---|---|---|---|---|
| ✓ | [B] | Rebel Yell | Billy Idol | Rebel Yell | Punk | 1983 | 2 | 94 |
| | [A] | Something More | Sugarland | Twice the Speed of Life | Country | 2005 | 12 | 91 |
| | [A] | Heart of the Night | Poco | Legend | Rock | 1978 | 11 | 86 |
| ✓ | [B] [C] [D] | Still Loving You | Scorpions | Love at First Sting | Metal | 1984 | 2 | 84 |
| | | ... | ... | ... | ... | ... | ... | ... |

| Cache | Title | Artist | Album | Genre | Year | Play Count | Score |
|---|---|---|---|---|---|---|---|
| ☑ [B] | Rebel Yell | Billy Idol | Rebel Yell | Punk | 1983 | 2 | 94 |
| ☐ [A] | Something More | Sugarland | Twice the Speed of Life | Country | 2005 | 12 | 91 |
| ☑ [A] [D] | Heart of the Night | Poco | Legend | Rock | 1978 | 11 | 86 |
| ☑ [B] [C] | Still Loving You | Scorpions | Love at First Sting | Metal | 1984 | 2 | 84 |
| ☑ [D] | You Get What You Give | New Radicals | Maybe You've Been Brain... | Alternative | 1998 | 4 | 59 |
| | ... | ... | ... | ... | ... | ... | ... |

SOURCE INDICATORS FOR ELEMENTS OF AN AGGREGATE MEDIA COLLECTION IN A MEDIA SHARING SYSTEM

RELATED APPLICATIONS

This application is related to U.S. patent application Ser. No. 12/251,513, entitled CACHING AND SYNCHING PROCESS FOR A MEDIA SHARING SYSTEM, which was filed on Oct. 15, 2008, U.S. patent application Ser. No. 12.251,530, entitled BRIDGING IN A MEDIA SHARING SYSTEM, which was filed on Oct. 15, 2008 and U.S. patent application Ser. No. 12/251,542, entitled COLLECTION DIGEST FOR A MEDIA SHARING SYSTEM, which was filed on Oct. 15, 2008, all of which are hereby incorporated herein by reference in their entireties.

FIELD OF THE INVENTION

The present invention relates to media sharing.

BACKGROUND OF THE INVENTION

With the advent of portable media players, such as the Apple® iPod® portable media players, digital media has become prolific. However, even though user media collections of many users include hundreds if not thousands of media items, no one user owns every media item. As such, users often desire to share their media collections. For example, the Apple® iTunes® media player allows users to share their media collections with up to five users on the same subnetwork. In the Apple® iTunes® media player, the sharing user must designate what portion of their media collection to share (e.g., the entire media collection, two or more songs, or a playlist). However, users with which the media collection is shared are limited by the fact that the shared media collection is disjoint from their own media collection. Another issue is that sharing is limited to users in the same subnetwork. Thus, there is a need for an improved system and method for sharing media collections.

SUMMARY OF THE INVENTION

The present invention relates to providing source indicators for one or more elements of an aggregate media collection of a user in a media sharing system. In one embodiment, a local media collection of a user is aggregated with one or more shared media collections hosted by corresponding user devices of other users participating in the media sharing system to provide an aggregate media collection for the user. A Graphical User Interface (GUI) enables the user to navigate and utilize the aggregate media collection. Further, for each element of at least a subset of elements of the aggregate media collection, one or more source indicators are presented in association with the element to identify a source or sources of the element in the media sharing system. The elements of the aggregate media collection include at least a subset of media items in the aggregate media collection, playlists including media items from the aggregate media collection, or both.

More specifically, in one embodiment, one or more source indicators is presented in association with each media item of at least a subset of the media items in the aggregate media collection. The one or more source indictors for a media item identify the source or sources of the media item in the media sharing system. In another embodiment, a single source indicator is presented in association each of at least a subset of the media items in the aggregate media collection, where the source indicator for a media item identifies the source from which the media item is to be obtained for playback. In addition or alternatively, a source indicator may be utilized as a thumb of a playback progress bar to identify a source of a media item from the aggregate media collection that is currently playing. In addition or alternatively, one or more source indicators may be presented in association with each of a number of aggregate playlists, where the one or more source indicators for an aggregate playlist identify the source or sources of media items in the aggregate playlist.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

FIGS. 8A through 8C illustrate an exemplary GUI enabling a user to manually select media items to cache or synch according to one embodiment of the present invention;

FIG. 12 is a GUI illustrating the selection of a media item for the initiation of a bridging process according to one embodiment of the present invention;

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
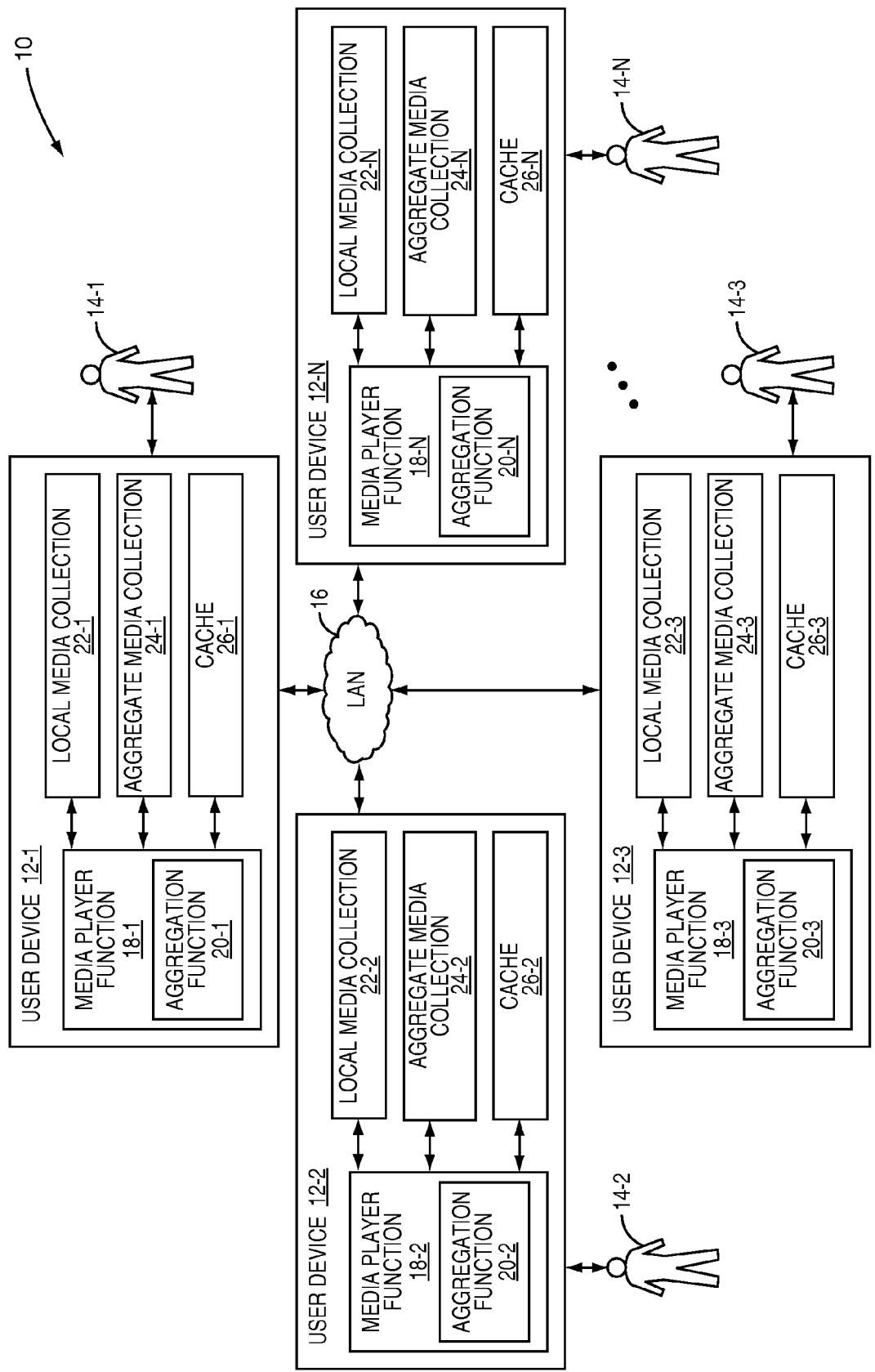
FIG. 1 illustrates a media sharing system according to one embodiment of the present invention.

FIG. 1 illustrates an exemplary media sharing system 10 according to one embodiment of the present invention. In general, the media sharing system 10 includes a number of user devices 12-1 through 12-N having associated users 14-1 through 14-N. In this embodiment, the user devices 12-1 through 12-N are connected via a Local Area Network (LAN) 16 and are part of the same subnetwork. However, the present invention is not limited thereto. The user devices 12-1 through 12-N may alternatively be connected via a Wide Area Network (WAN), a global network such as the Internet, or the like. As yet another alternative, some of the user devices 12-1 through 12-N may be connected via a LAN while others are connected via a WAN or global network.

Each of the user devices 12-1 through 12-N may be, for example, a personal computer, a mobile smart phone, a set-top box, a portable media player, or the like. Looking at the user device 12-1, the user device 12-1 includes a media player function 18-1 which may be implemented in software, hardware, or a combination thereof. In addition to providing media playback capabilities, the media player function 18-1 includes an aggregation function 20-1. In an alternative embodiment, the aggregation function 20-1 may be implemented as a separate function. For example, if the media player function 18-1 is a software media player application, the aggregation function 20-1 may be implemented as a plug-in. In general, the aggregation function 20-1 operates to generate an aggregate media collection 24-1 for the user 14-1 including media items in a local media collection 22-1 of the user 14-1 and media items from one or more remote shared media collections hosted by one or more of the other user devices 12-2 through 12-N. The local media collection 22-1 of the user 14-1 includes a number of media items owned by the user 14-1 and stored at the user device 12-1. The media items may include one or more audio items such as, for example, songs, podcasts, or audio books; one or more video items such as, for example, movies, television programs, or video clips; or the like. In addition, the user device 12-1 may include cache 26-1. As discussed below, the cache 26-1 may be utilized to temporarily store shared media items obtained from one or more of the other user devices 12-2 through 12-N via caching.

Like the user device 12-1, the other user devices 12-2 through 12-N include media player functions 18-2 through 18-N having corresponding aggregation functions 20-2 through 20-N. In addition, the other user devices 12-2 through 12-N include local media collections 22-2 through 22-N, aggregate media collections 24-2 through 24-N, and storages 26-2 through 26-N, respectively.

Figure 2:
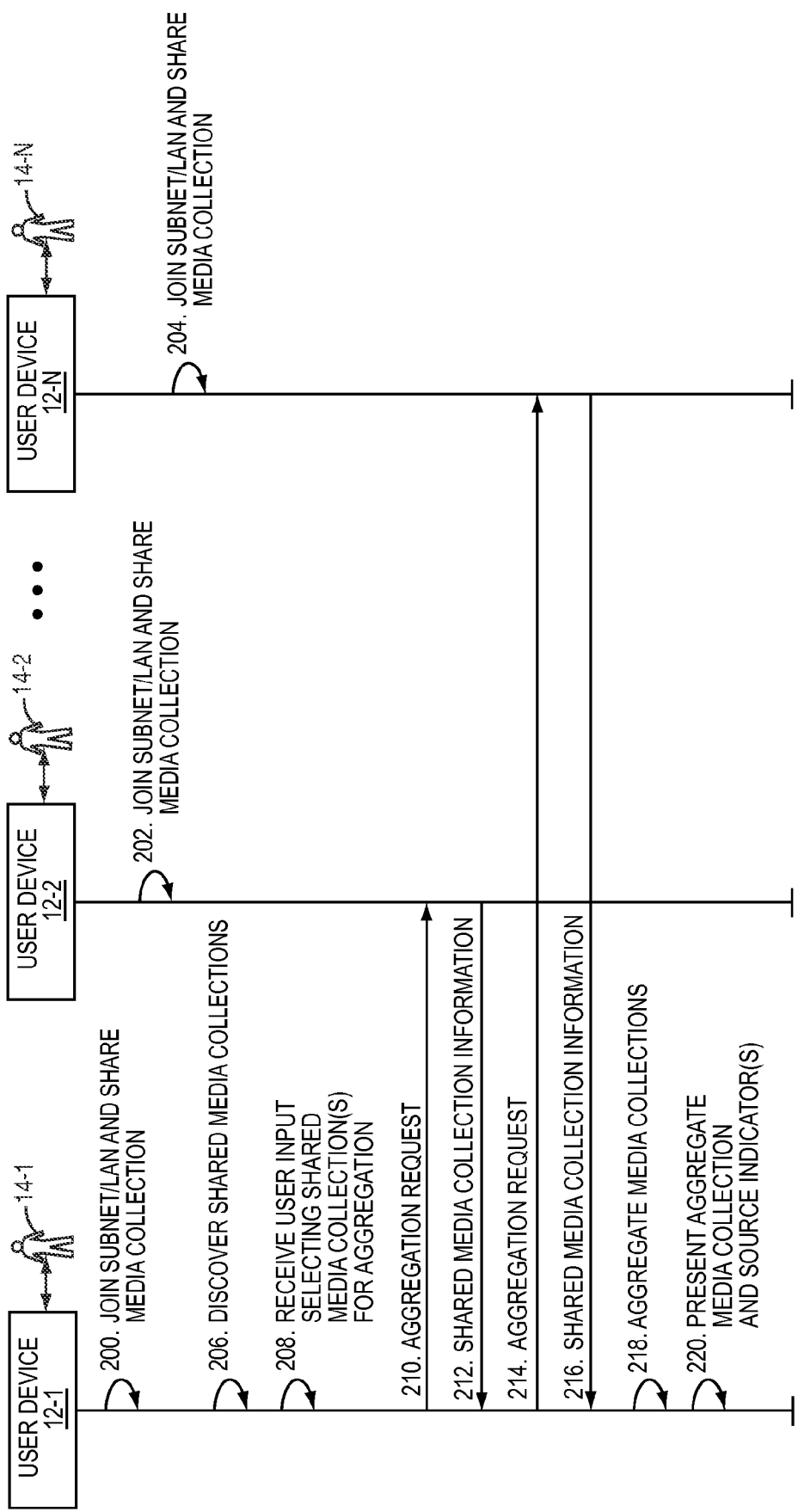
FIG. 2 illustrates the operation of the media sharing system including the presentation of one or more source indicators according to one embodiment of the present invention.

FIG. 2 illustrates the operation of the media sharing system 10 of FIG. 1 according to one embodiment of the present invention. First, the user devices 12-1 and 12-2 through 12-N join the LAN 16 by, for example, coming online (steps 200-204). Next, the aggregation function 20-1 of the user device 12-1 identifies, or discovers, media collections shared by the users 14-2 through 14-N of the user devices 12-2 through 12-N (step 206). For example, in a MAC OSX or Windows environment where the user devices 12-1 through 12-N are connected via the LAN 16, Bonjour may be used to identify the shared media collections of the users 14-2 through 14-N. The media collections shared by the users 14-2 through 14-N are preferably the local media collections 22-2 through 22-N of the users 14-2 through 14-N. However, the present invention is not limited thereto. In one exemplary alternative embodiment, the media collections shared by the users 14-2 through 14-N may be the aggregate media collections 24-2 through 24-N of the users 14-2 through 14-N. In this embodiment, the aggregation function 20-1 of the user device 12-1 presents a list of the shared media collections of the users 14-2 through 14-N to the user 14-1 and then receives user input from the user 14-1 selecting one or more of the shared media collections for aggregation (step 208). In this example, the user 14-1 selects at least the shared media collections of the users 14-2 and 14-N, which are hosted by the user devices 12-2 and 12-N, respectively.

The aggregation function 20-1 of the user device 12-1 then issues an aggregation request to the user device 12-2 of the user 14-2 (step 210). In response, in this embodiment, the aggregation function 20-2 of the user device 12-2 returns information, which is also referred to herein as shared media collection information, identifying media items in the shared media collection of the user 14-2 to the user device 12-1 of the user 14-1 (step 212). Likewise, the aggregation function 20-1 of the user device 12-1 issues an aggregation request to the user device 12-N of the user 14-N (step 214). In response, the aggregation function 20-N of the user device 12-N returns information identifying media items in the shared media collection of the user 14-N to the user device 12-1 of the user 14-1 (step 216). Note that aggregation requests may also be issued to and shared media collection information received from other user devices from the user devices 12-3 through 12-N-1 (not shown) hosting shared media collections selected by the user 14-1.

Upon receiving the shared media collection information, the aggregation function 20-1 of the user device 12-1 aggregates or merges the local media collection 22-1 of the user 14-1 and the shared media collections to provide the aggregate media collection 24-1 of the user 14-1 (step 218). More specifically, in one embodiment, the aggregation function 20-1 of the user device 12-1 aggregates the shared media collection information identifying the media items in the shared media collections selected by the user 14-1 for aggregation and information identifying the media items in the local media collection 22-1 of the user 14-1 to provide a list of unique media items available either from the local media collection 22-1 of the user 14-1 or one of the shared media collections selected by the user 14-1 for aggregation. In addition, for each unique media item, a secondary list of available sources for the unique media item may be generated. Together, the list of unique media items and the corresponding secondary lists of sources for the unique media items form the aggregate media collection 24-1 of the user 14-1. For more information, the interested reader is directed to commonly owned and assigned U.S. patent application Ser. No. 12/104,572, entitled METHOD AND SYSTEM FOR AGGREGATING MEDIA COLLECTIONS BETWEEN PARTICIPANTS OF A SHARING NETWORK, which was filed on Apr. 17, 2008 and is hereby incorporated herein by reference in its entirety. Note that while the discussion herein focuses on an embodiment where the shared media collections are aggregated with the local media collection 22-1 of the user 14-1, the present invention is not limited thereto. The user 14-1 may choose not to select his local media collection 22-1 for aggregation, in which case the shared media collections would be aggregated with one another to provide the aggregate media collection 24-1 of the user 14-1.

In addition to including media items, the aggregate media collection 24-1 of the user 14-1 may include an aggregate list of playlists, or aggregate playlists. More specifically, the local media collection 22-1 of the user 14-1 as well the shared media collections selected by the user 14-1 for aggregation may include static or dynamic playlists. Information identifying the playlists may then be included within or provided in association with the shared media collection information. Then, when generating the aggregate media collection 24-1 of the user 14-1, the aggregation function 20-1 of the user device 12-1 may also aggregate the playlists of the shared media collections selected by the user 14-1 and the playlists in the local media collection 22-1 of the user 14-1. When aggregating playlists, a list of unique playlists may be generated. As used herein, a unique playlist is a playlist having a unique title. Playlists having the same title may be combined or merged. For example, an "80s" playlist of the user 14-1 may be combined with an "80s" playlist of the user 14-2 to provide an aggregate "80s" playlist including both the media items from the "80s" playlist of the user 14-1 and the media items from the "80s" playlist of the user 14-2.

Once the aggregate media collection 24-1 of the user 14-1 is generated, the aggregate media collection 24-1 and one or more source indicators are presented to the user 14-1 via, for example, a Graphical User Interface (GUI) (step 220). Each source indicator is presented in association with a corresponding element of the aggregate media collection 24-1 and operates to identify a source for that element of the aggregate media collection 24-1. The source of an element of the aggregate media collection 24-1 may be the local media collection 22-1 of the user 14-1 or one of the shared media collections selected by the user 14-1 for aggregation. As used herein, an element of the aggregate media collection 24-1 may be a playlist in the aggregate media collection 24-1 or a unique media item in the aggregate media collection 24-1.

At this point, the user 14-1 may utilize the aggregate media collection 24-1 in much the same manner as using the local media collection 22-1. For example, the user 14-1 may select media items from the aggregate media collection 24-1 for playback, generate playlists including media items from the aggregate media collection 24-1, generate smart or dynamic playlists that are populated from the aggregate media collection 24-1, play media items in an existing playlist, or the like. In one embodiment, in order to provide playback of a media item that is from a shared media collection of another user, the media item is requested from the user device hosting the shared media collection and streamed from that user device to the user device 12-1 of the user 14-1. For example, if the user 14-1 initiates playback of a media item and that media item's source is the shared media collection hosted by the user device 12-2, the media player function 18-1 of the user device 12-1 requests the media item from the user device 12-2. In response, the user device 12-2, and specifically the media player function 18-2 of the user device 12-2, delivers the media item to the user device 12-1 for playback. In the preferred embodiment, the media item is delivered via streaming.

FIGS. 3A through 3E illustrate an exemplary GUI 28 for presenting one or more source indicators in association with one or more elements of an aggregate media collection of a user according to one embodiment of the present invention. Note that in this exemplary embodiment, the media items shared via the media sharing system 10 are songs. However, as discussed above, the present invention is not limited thereto.

Figure 3A:
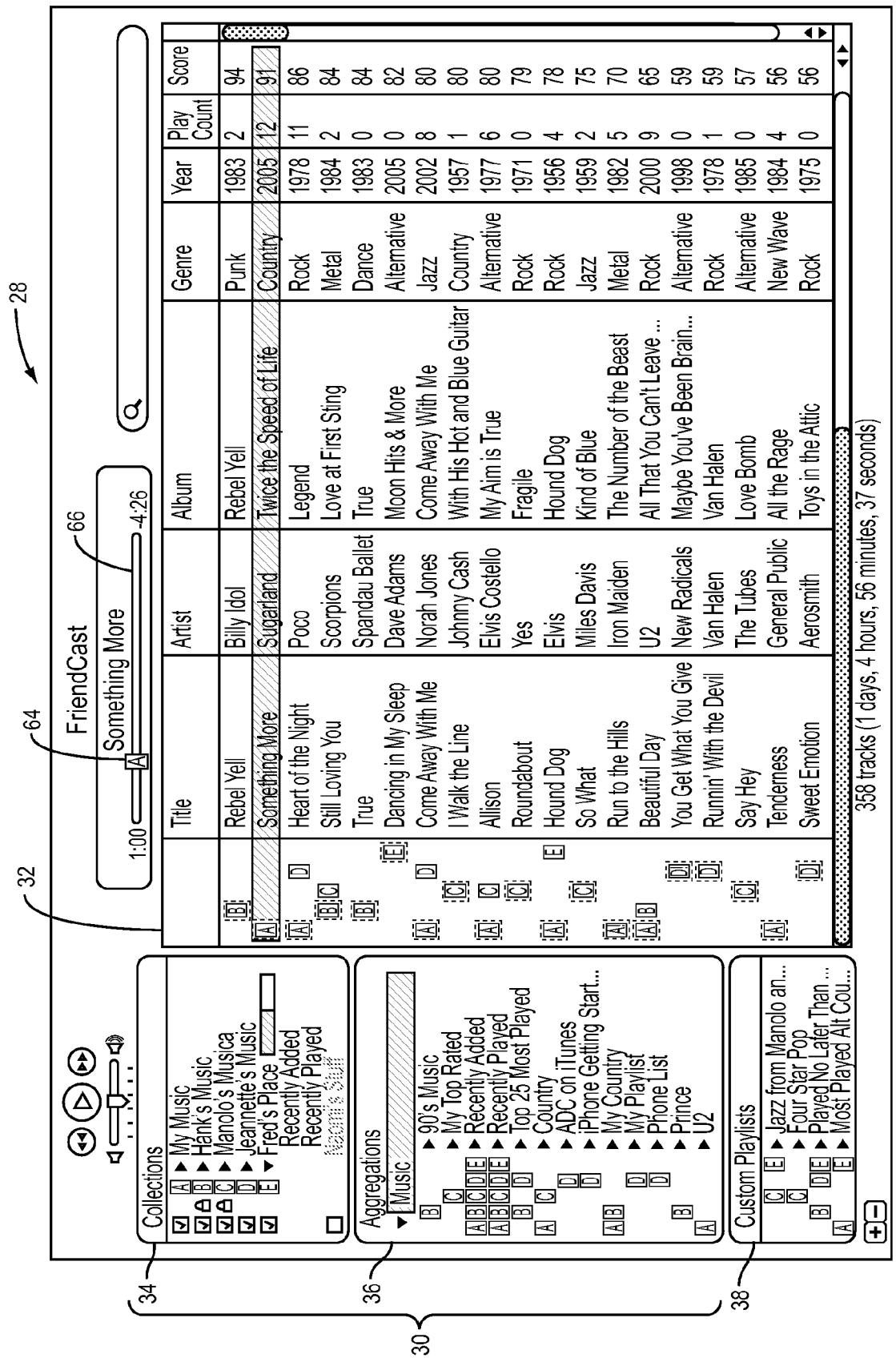
FIGS. 3A through 3E illustrate an exemplary Graphical User Interface (GUI) including source indicators according to one embodiment of the present invention.

As shown in FIG. 3A, the GUI 28 includes a navigation area 30 and a display area 32. The navigation area 30 generally enables the user, which in this example is the user 14-1, to select media collections to be aggregated as well as to navigate his aggregate media collection 24-1. The navigation area 30 includes a media collection selection area 34 and a playlist selection area 36. The media collection selection area 34 is used to present a list of media collections available to the user 14-1 and to enable the user 14-1 to select two or more of the media collections for aggregation. In this example, the list of media collections available to the user 14-1 includes the local media collection 22-1 of the user 14-1, which has the title "My Music," and five shared media collections having the titles "Hank's Music," "Manolo's Musica," "Jeannette's Music," "Fred's Place," and "Naomi's Stuff." In this example, the user 14-1 has selected his local media collection 22-1 having the title "My Music" and the shared media collections having the titles "Hank's Music," "Manolo's Musica," "Jeannette's Music," and "Fred's Place" for aggregation. Note that the maximum number of collections that may be selected for aggregation may be limited. For example, the media sharing system 10 may limit the number of shared media collections that a user may select for aggregation to five (5).

As discussed below in detail, each of the media collections selected for aggregation is assigned a unique source identifier. In this example, the source identifiers are alphabetic letters (A, B, C, etc.). However, the present invention is not limited thereto. Any type of indicator enabling the user 14-1 to visually distinguish sources of elements of his aggregate media collection 24-1 may be used. For example, in another embodiment, each of the media collections selected for aggregation, which are also referred to herein as sources, may be assigned a unique color. The colors may then be used as source indicators by placing corresponding colored blocks or boxes next to the corresponding elements of the aggregate media collection 24-1 and/or by using text of the corresponding colors for the corresponding elements of the aggregate media collection 24-1.

The playlist selection area 36 generally enables the user 14-1 to navigate his aggregate media collection 24-1. In this example, the aggregate media collection 24-1 is an aggregate music collection. Thus, by selecting the "Music" identifier in the playlist selection area 36, a list of the unique songs in the aggregate music collection 24-1 of the user 14-1 is presented in the display area 32. Further, in this example, the "Music" identifier is hierarchical. In other words, the "Music" identifier may be expanded as shown to view a list of aggregate playlists in the aggregate music collection 24-1 of the user 14-1. Note that source identifiers are presented in association with each aggregate playlist to indicate the source or sources of media items in the aggregate playlist.

In addition, the GUI 28 includes a custom playlists area 38. The custom playlists area 38 enables the user 14-1 to define static or dynamic playlists created specifically for the aggregate media collection 24-1.

Figure 3B:
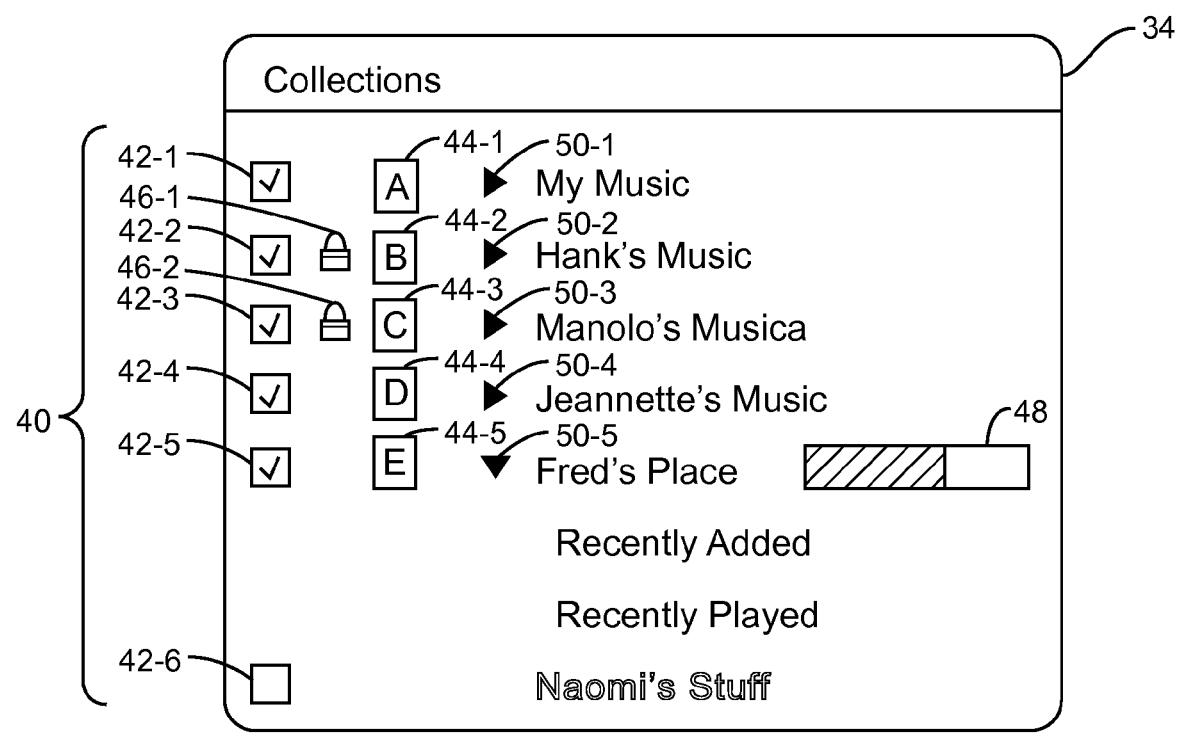

FIG. 3B is a blow-up of the media collection selection area 34 of FIG. 3A. As shown, the media collection selection area 34 includes a list of media collections 40 available to the user 14-1. The user 14-1 is enabled to select desired media collections for aggregation via corresponding check boxes 42-1 through 42-6. In this example, the user 14-1 has selected his local media collection 22-1, which is titled "My Music," and the shared media collections "Hank's Music," "Manolo's Musica," "Jeannette's Music," and "Fred's Place" by activating the corresponding check boxes 42-1 through 42-5. Note that, in this example, the user 14-1 is limited to selecting at most five (5) media collections for aggregation. As such, since five (5) media collections have been selected, the shared media collection "Naomi's Stuff" is grayed-out and cannot be selected by the user 14-1 unless the user 14-1 deselects one of the other selected media collections. Note that the maximum number of media collections that may be selected is preferably a system-defined limit. However, in an alternative embodiment, the user 14-1 may be enabled to define the maximum number of media collections that may be aggregated.

Further, unique source indicators 44-1 through 44-5 (hereinafter source indicators 44-1 through 44-5) are assigned to the media collections selected for aggregation. In this example, the source indicators 44-1 through 44-5 are the letters A, B, C, D, and E positioned inside boxes. However, the present invention is not limited thereto. For example, the source indicators 44-1 through 44-5 may alternatively be colors. As discussed below, the source indicators 44-1 through 44-5 are presented in association with elements of the aggregate media collection 24-1 of the user 14-1 in order to identify the source or sources for the elements of the aggregate media collection 24-1 of the user 14-1.

Password-protection indicators 46-1 and 46-2 indicate that the corresponding media collections are password protected. As such, the user 14-1 must enter the correct passwords for the password protected media collections before the media collections can be aggregated or, alternatively, before the user 14-1 is enabled to play the media items from the password protected media collections. A progress indicator 48 may be used to show the progress of obtaining or downloading the shared media collection information for the corresponding shared media collection. Thus, in this example, the shared media collection information for the selected shared media collections other than "Fred's Place" have already been downloaded, and the download of the shared media collection information for "Fred's Place" is still in progress.

In this example, the identifiers for the selected media collections are hierarchical. As such, hierarchical controls 50-1 through 50-5 may be used to expand the identifiers to show a number of subgroups of media items within the corresponding media collections. In this example, the subgroups are playlists. As such, using "Fred's Place" as an example, the hierarchical control 50-5 may be activated to view the playlists included in the shared media collection "Fred's Place," which are a "Recently Added" playlist and a "Recently Played" playlist.

Figure 3C:
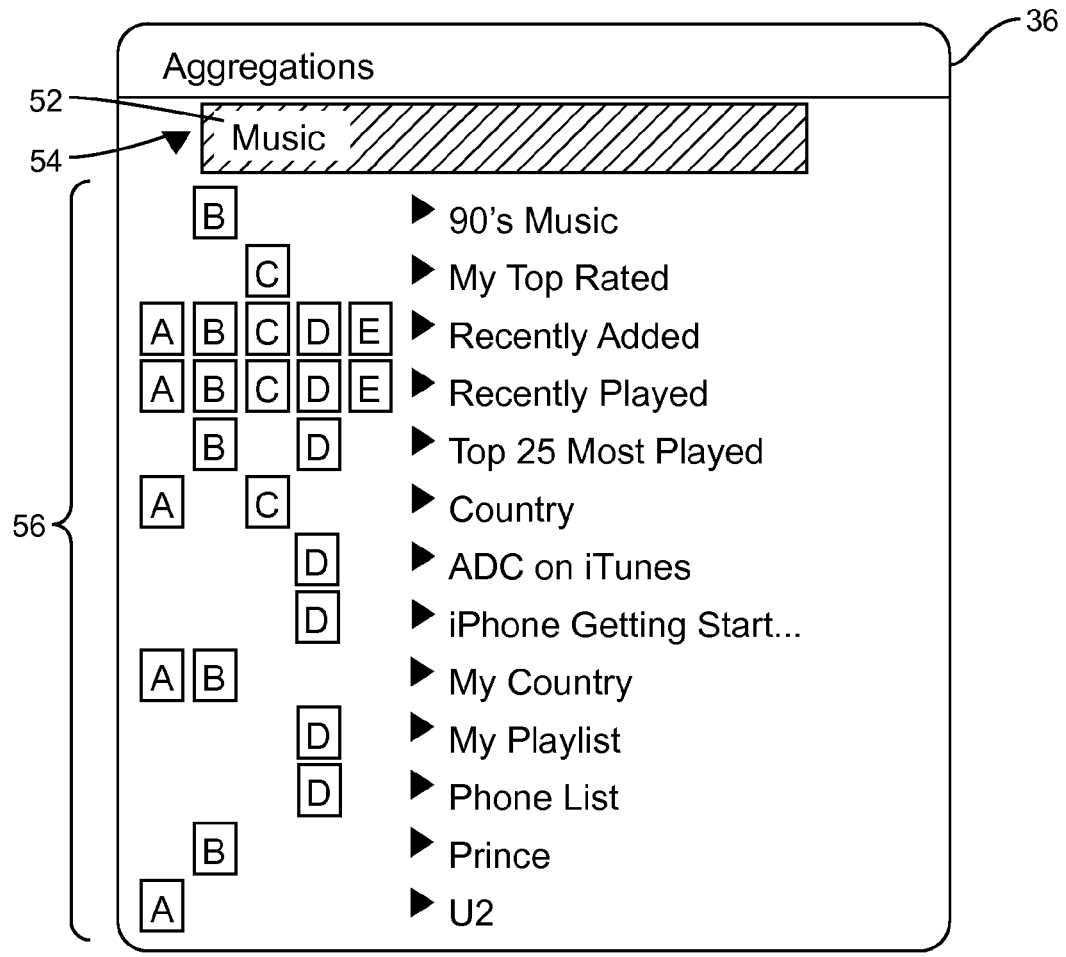

FIG. 3C is a blow-up of the playlist selection area 36. As discussed above, the playlist selection area 36 generally enables the user 14-1 to navigate his aggregate media collection 24-1. In this example, the aggregate media collection 24-1 is an aggregate music collection. Thus, by selecting a "Music" identifier 52, a list of the unique songs in the aggregate media collection 24-1 of the user 14-1 is presented in the display area 32 (FIG. 3A). Further, in this example, the "Music" identifier 52 is hierarchical. As such, by selecting hierarchical control 54, the user 14-1 can expand the "Music" identifier 52 to view a list of aggregate playlists 56 in the aggregate music collection 24-1 of the user 14-1. In this example, the aggregate playlists include a "90's Music" playlist, a "My Top Rated" playlist, etc.

One or more source indicators are presented in association with each of the aggregate playlists in order to identify the source or sources of the media items in the aggregate playlists. The source indicators presented in association with the aggregate playlists correspond to the source indicators 44-1 through 44-5 (FIG. 3B) assigned to the media collections selected for aggregation. As such, the user 14-1 can easily identify which source or sources contribute to each of the aggregate playlists. For example, the "90's Music" playlist has only media items from the source identified by the "B" source indicator, which in this example is the "Hank's Music" shared media collection (FIG. 3B). As another example, the "Top 25 Most Played" playlist has media items from the sources identified by the "B" source identifier and the "D" source identifier, which in this example are the "Hank's Music" and "Jeannette's Music" shared media collections.

Figure 3D:
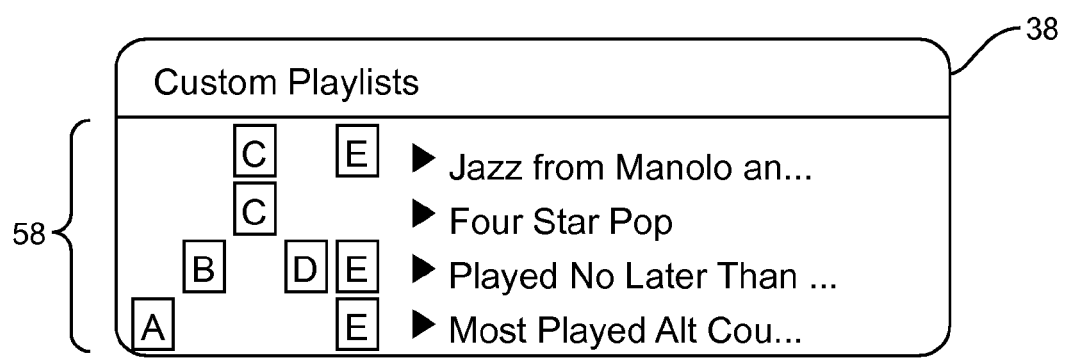

FIG. 3D is a blow-up of the custom playlists area 38 of FIG. 3A. One or more source indicators are presented in association with each custom playlist in a list of custom playlists 58 in order to identify the source or sources of the media items in the custom playlists. The source indicators presented in association with the custom playlists correspond to the source indicators 44-1 through 44-5 (FIG. 3B) assigned to the media collections selected for aggregation. As such, the user 14-1 can easily identify which sources contribute to each of the custom playlists. For example, the "Jazz from Manolo an . . . " playlist has only media items from the sources identified by the "C" source indicator and the "E" source indicator, which in this example are the "Manolo's Musica" and the "Fred's Place" shared media collections (FIG. 3B).

Figure 3E:
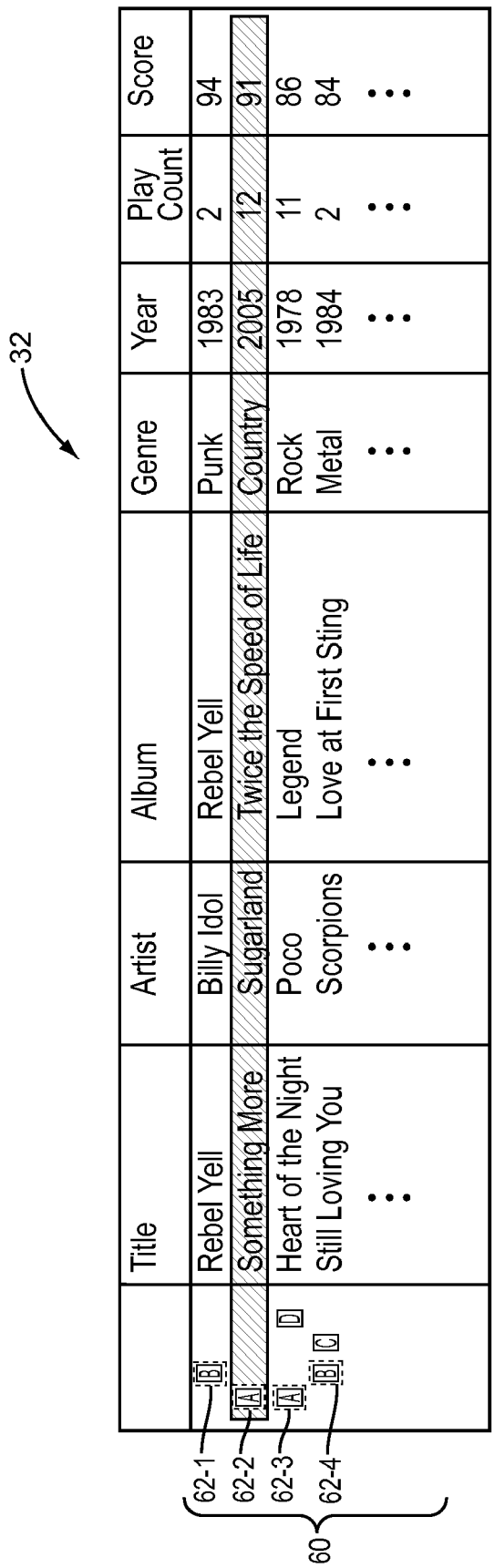

FIG. 3E illustrates a list of media items 60 presented in the display area 32 of FIG. 3A. One or more source indicators are presented in association with each media item in the list of media items 60 in order to identify the source or sources for the media items. Again, the source indicators presented in association with the media items correspond to the source indicators 44-1 through 44-5 (FIG. 3B) assigned to the media collections selected for aggregation. As such, the user 14-1 can easily identify the source or sources for each media item in the list of media items 60. For example, the song "Rebel Yell" has only one source identified by the source indicator "B," which in this example corresponds to the "Hank's Music" shared media collection. As another example, the song "Still Loving You" has two sources identified by the source indicator "B" and the source indicator "C," which in this example correspond to the "Hank's Music" and "Manolo's Musica" shared media collections. Further, indicators 62-1 through 62-4 are used to identify one source for each of the media items from which the media item is to be obtained or streamed. For example, the song "Still Loving You" is to be obtained from the user device hosting "Hank's Music," which is identified by the source indicator "B." In this example, the indicators 62-1 through 62-4 are dashed boxes placed around the source indicators of the sources from which the media items are to be obtained. However, the present invention is not limited thereto. Other types of indicators 62-1 through 62-4 may be used.

Returning briefly to FIG. 3A, optionally, a source indicator 64 may also be used as the thumb of a playback progress bar 66 in order to identify the source of the currently playing media item. In this example, the song "Something More" is currently playing, and the source of the song "Something More" is identified by the source indicator "A," which in this example is the local media collection 22-1 ("My Music") of the user 14-1.

Figure 4:
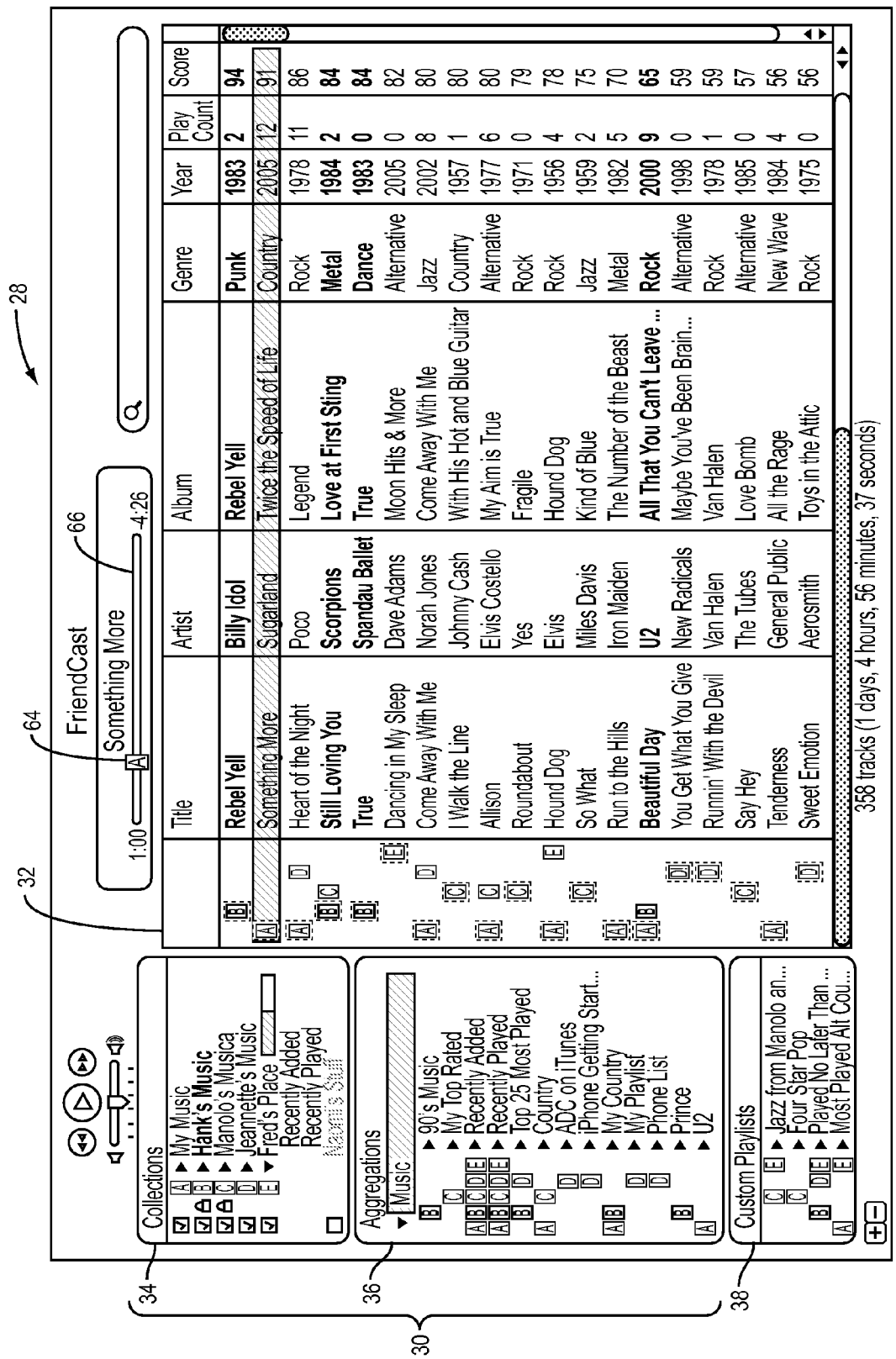
FIG. 4 illustrates an exemplary GUI wherein elements associated with a selected source are highlighted according to one embodiment of the present invention.

FIG. 4 illustrates another feature of the GUI 28 wherein elements of the aggregate media collection 24-1 of the user 14-1 associated with a select source are highlighted according to one embodiment of the present invention. In this example, the user 14-1 has selected the "Hank's Music" shared media collection identifier in the media collection selection area 34. As a result, all "B" source indicators are highlighted such that the user 14-1 is enabled to quickly identify aggregate playlists including media items for which "Hank's Music" is a source, custom playlists including media items for which "Hank's Music" is a source, and media items in the display area 32 for which "Hank's Music" is a source. Note that while the "B" source indicators are highlighted by making them bold in this exemplary embodiment, the present invention is not limited thereto. For example, if the source indicators are colored boxes rather than letters, the colored boxes operating as the source indicator for "Hank's Music" may be brightened. Further, the colored boxes operating as source indicators for the other sources may be dimmed.

Figure 5:
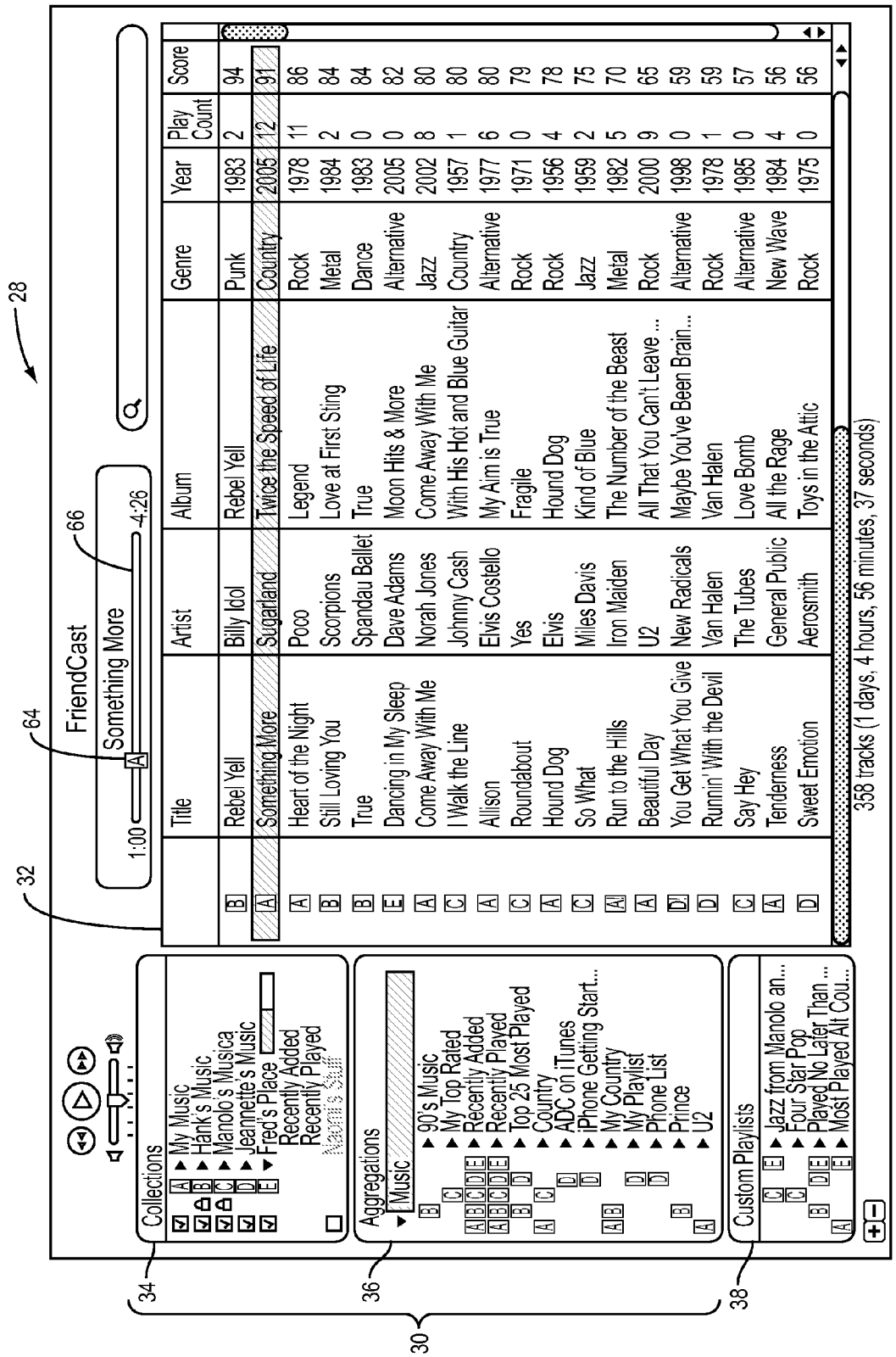
FIG. 5 illustrates an exemplary GUI including source indicators according to another embodiment of the present invention.

FIG. 5 illustrates the GUI 28 according to another embodiment of the present invention. In this embodiment, in the display area 32, only one source indicator is presented in association with each media item. More specifically, rather than presenting a source indicator for each source of a media item and then highlighting the source indicator of the source from which the media item is to be obtained, in this embodiment, only the source indicator for the source from which the media item is to be obtained is presented. Thus, for example, in this embodiment, the song "Still Loving You" will be obtained from the user device hosting the "Hank's Music" shared media collection as indicated by the "B" source indicator.

Figure 6:
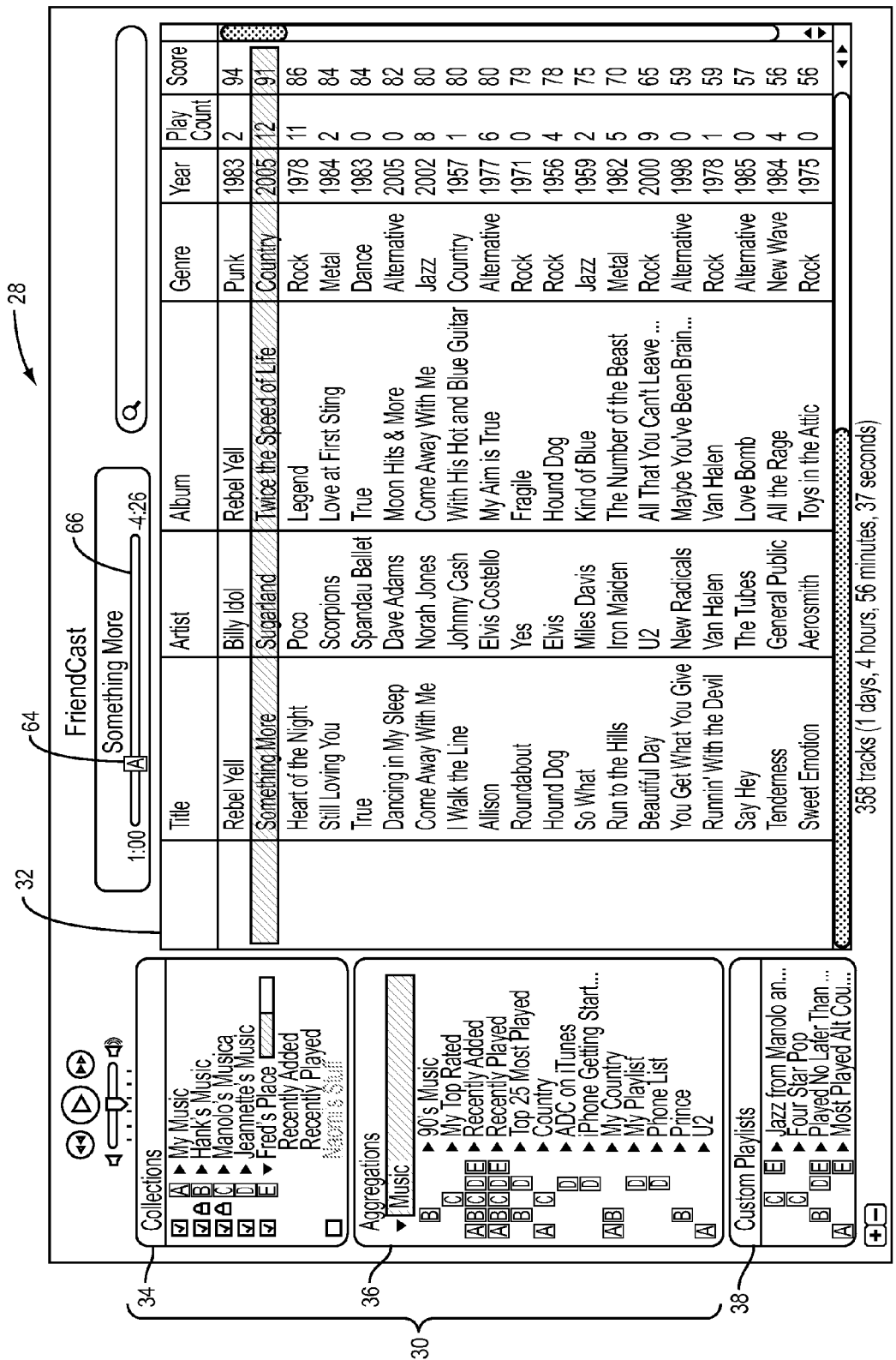
FIG. 6 illustrates an exemplary GUI including source indicators according to yet another embodiment of the present invention.

FIG. 6 illustrates the GUI 28 according to yet another embodiment of the present invention. In this embodiment, source indicators are not presented in association with the media items in the display area 32. However, the source indicator 64 for the currently playing song is presented as the thumb of the playback progress bar 66. In another embodiment, if the currently playing media item is available from multiple sources, the thumb of the playback progress bar 66 may include the source indicator for each of those sources. In addition, the thumb of the playback progress bar 66 may include other identifiers such as, for example, a dashed box around the source indicator of the source from which the media item is being obtained.

Figure 7:
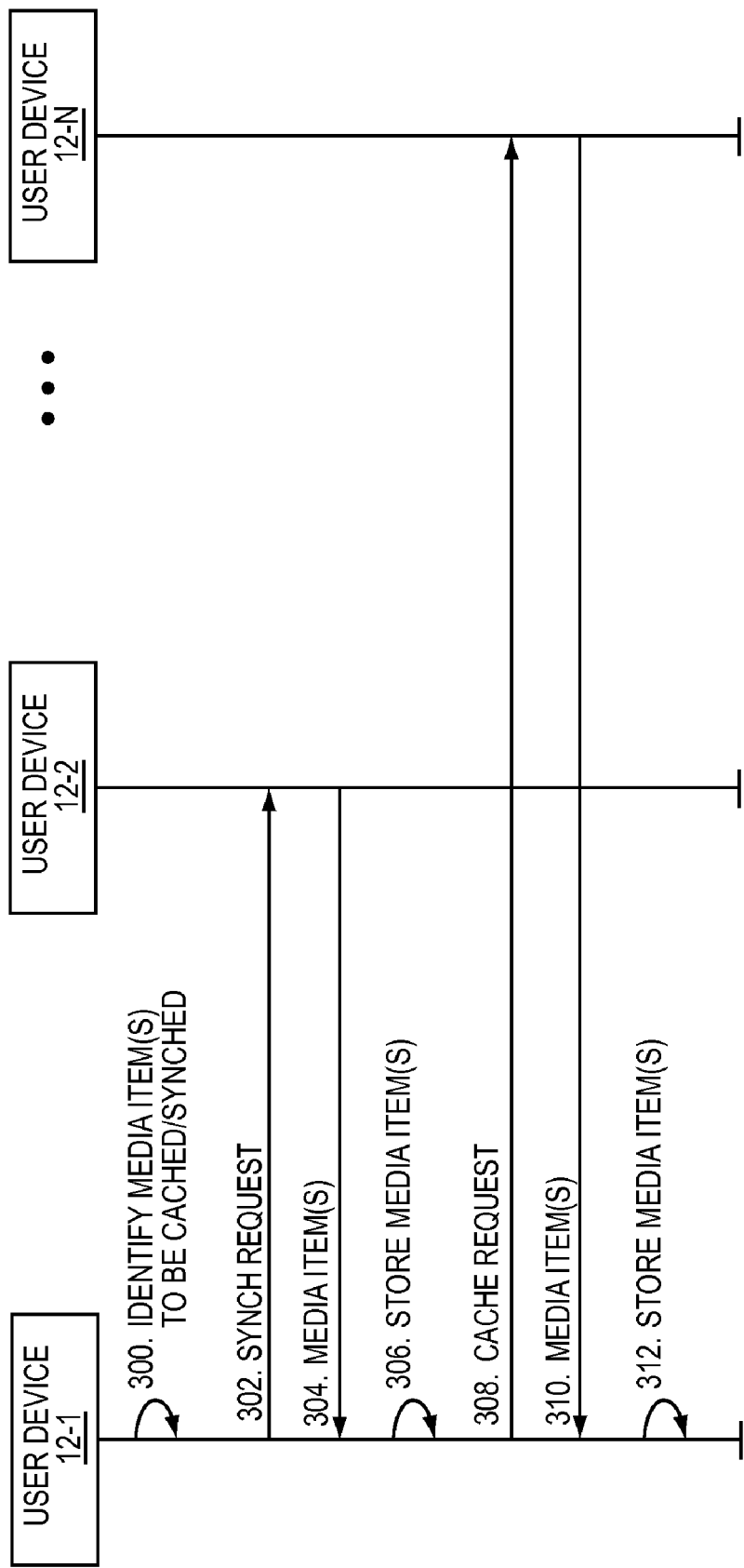
FIG. 7 illustrates a caching or synching process according to one embodiment of the present invention.

FIG. 7 illustrates a caching and synchronization (synching) process according to one embodiment of the present invention. As discussed above, shared media items are preferably delivered via streaming. However, in this embodiment, some media items may be proactively cached such that the shared media items are temporarily available in at least a limited form even if the user device hosting the corresponding shared media collection becomes unavailable by, for example, going offline, disabling sharing, or the like. In addition, one or more of the shared media collections selected for aggregation may be owned by the user 14-1 and hosted by another user device of the user 14-1. As used herein, a media item is owned by the user 14-1 if the user 14-1 has purchased the media item or has otherwise obtained access rights to the media item via, for example, a subscription service. As such, one or more media items owned by the user 14-1 and included in a shared media collection hosted by another user device may be manually or automatically selected for synching to the user device 12-1.

More specifically, in this example, the aggregation function 20-1, or the media player function 18-1, of the user device 12-1 first identifies one or more media items to be cached or synched to the user device 12-1 (step 300). As discussed below, in one embodiment, the user 14-1 selects playlists and/or individual media items to cache or synch to the user device 12-2. In another embodiment, media items are scored based on user preferences of the user 14-1. Media items having scores greater than a defined threshold score are then automatically selected to be cached or synched to the user device 12-1. Note that whether a media item is cached or synched depends on whether that media item is or is not from a shared media collection owned by the user 14-1. Media items from shared media collections that are not owned by the user 14-1 are cached to the user device 12-1 such that the user 14-1 has limited access rights to those media items. Media items from shared media collections that are owned by the user 14-1 may be synched to the user device 12-1 such that the user 14-1 has unlimited access rights to those media items. Note that in an alternative embodiment, media items from shared media collections may be cached at the user device 12-1 such that the user has limited access rights to those media items regardless of whether the corresponding shared media collections are or are not owned by the user 14-1.

In this example, the shared media collection hosted by the user device 12-2 is owned by the user 14-1 (i.e., the user 14-1 and the user 14-2 are the same user), and one or more media items from the shared media collection hosted by the user device 12-2 are selected for synching. Note that the shared media collection hosted by the user device 12-2 may appear in the media collection selection area 36 (FIG. 3A) of the GUI 28 like other shared media collections. Upon selection of the shared media collection hosted by the user device 12-2 for aggregation, credentials of the user 14-1, such as a synching password, may be used to prove ownership of the shared media collection hosted by the user device 12-2 to enable synching.

In order to obtain the one or more media items identified for synching, the aggregation function 20-1, or the media player function 18-1, of the user device 12-1 sends a request to the user device 12-2 for the one or more media items to be synched to the user device 12-1 (step 302). In response, the aggregation function 20-2, or the media player function 18-2, of the user device 12-2 returns the one or more requested media items to the user device 12-1 (step 304). The one or more media items obtained from the user device 12-2 are stored at the user device 12-1 (step 306). Note that the synched media items may be marked or flagged as owned by the user 14-1 such that the user 14-1 has unlimited access rights to the synced media items. In addition or alternatively, the synched media items may be added to the local media collection 22-1 of the user device 12-1.

In addition, one or more media items from a shared media collection hosted by the user device 12-N and not being owned by the user 14-1 are selected for caching. As such, the aggregation function 20-1, or the media player function 18-1, of the user device 12-1 sends a request to the user device 12-N for the one or more media items to be cached at the user device 12-1 (step 308). In response, the aggregation function 20-N, or the media player function 18-N, of the user device 12-N returns the one or more requested media items to the user device 12-1 (step 310), and the one or more media items are stored in the cache 26-1 of the user device 12-1 (step 312). Note that in the preferred embodiment, the user 14-1 has limited access rights to the cached media items. For example, playback of each cached media item may be limited to a maximum play count of five (5). As another example, only previews of the cached media items, rather than the complete media items, may be available to the user 14-1 unless the user 14-1 thereafter purchases the cached media items. The previews of the cached media items may be obtained and stored in the cache 26-1 of the user device 12-1. Alternatively, complete versions of the cached media items may be obtained and stored at the user device 12-1, wherein the previews of the cached media items may be generated by the aggregation function 20-1 of the media player function 18-1.

Figure 8A:
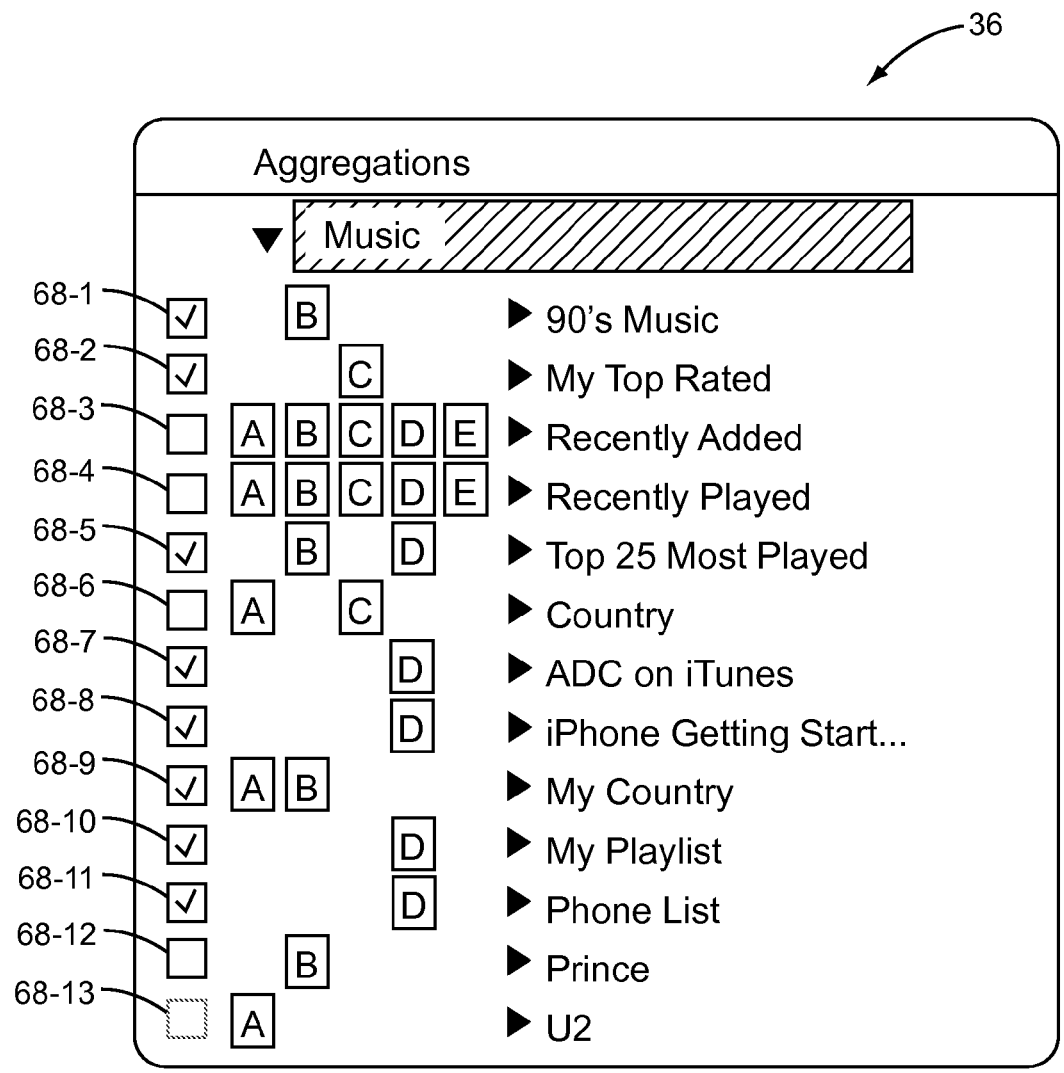
Figure 8B:
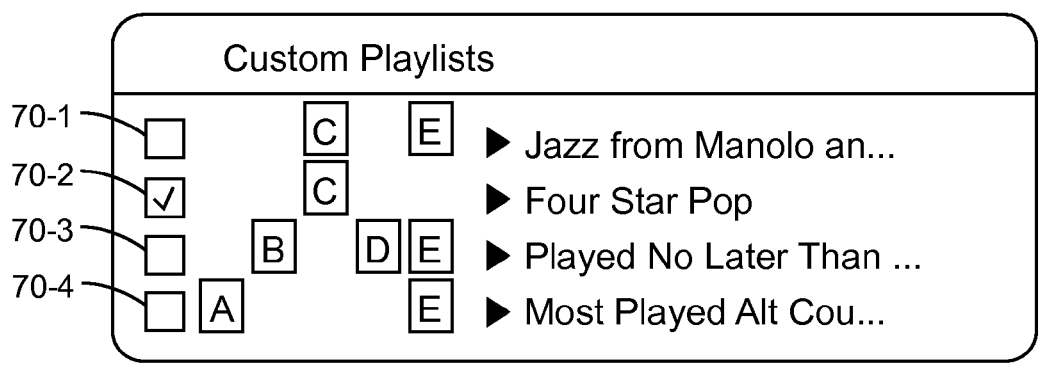

FIGS. 8A through 8C illustrate modified versions of the playlist selection area 36, the custom playlists area 38, and the display area 32 of the GUI 28 (FIG. 3A) that enable the user 14-1 to select media items to be cached or synched according to one embodiment of the present invention. FIG. 8A illustrates a modified version of the playlist selection area 36 of the GUI 28 that further comprises check boxes 68-1 through 68-13 enabling the user 14-1 to select aggregate playlists to cache or synch. Once an aggregate playlist is selected by the user 14-1, shared media items in the aggregate playlist are identified as media items to be cached or synched. Again, in this embodiment, media items to be sourced from a shared media collection owned by the user 14-1 are synched, and media items to be sourced from a shared media collection not owned by the user 14-1 are cached. Thus, in this example, the user 14-1 has selected the "90's Music," "My Top Rated," and "Top 25 Most Played" aggregate playlists by selecting the check boxes 68-1, 68-2, and 68-5. As such, all shared media items included in the "90's Music," "My Top Rated," and "Top 25 Most Played" aggregate playlists are identified as media items to be cached or synched depending on the sources from which the media items are to be obtained. Then, as discussed above, the identified media items are obtained from the user device(s) hosting the corresponding shared media collections and stored at the user device 12-1. Note that media items from the local media collection 22-1 that are already stored at the user device 12-1 do not need to be cached or synched. As such, in this example, the check box 68-13 is grayed-out since the "U2" playlist includes only media items from the local media collection 22-1 that are stored locally at the user device 12-1.

FIG. 8B illustrates a modified version of the custom playlists area 38 of the GUI 28 that further comprises check boxes 70-1 through 70-4 enabling the user 14-1 to select custom playlists to cache or synch. Once a custom playlist is selected by the user 14-1, shared media items in the shared playlist are identified as media items to be cached or synched depending on the sources of the media items. Thus, in this example, the user 14-1 has selected the "Four Star Pop" custom playlist by selecting the check box 70-2. As such, all shared media items included in the "Four Star Pop" custom playlist are identified as media items to be cached or synched. Then, as discussed above, the identified media items are obtained from the user device(s) hosting the corresponding shared media collections and stored at the user device 12-1.

FIG. 8C illustrates a modified version of the display area 32 of the GUI 28 that further comprises check boxes 72-1, 72-2, et seq. to select media items to cache or synch. The media items selected by the user 14-1 are identified as media items to be cached or synched depending on the sources of the media items. Then, as discussed above, the identified media items are obtained from the user device(s) hosting the corresponding shared media collections and stored at the user device 12-1. Note that the check boxes 72-2 and 72-3 are grayed out since the songs "Something More" and "Heart of the Night" are already included in the local media collection 22-1 of the user 14-1.

Figure 9A:
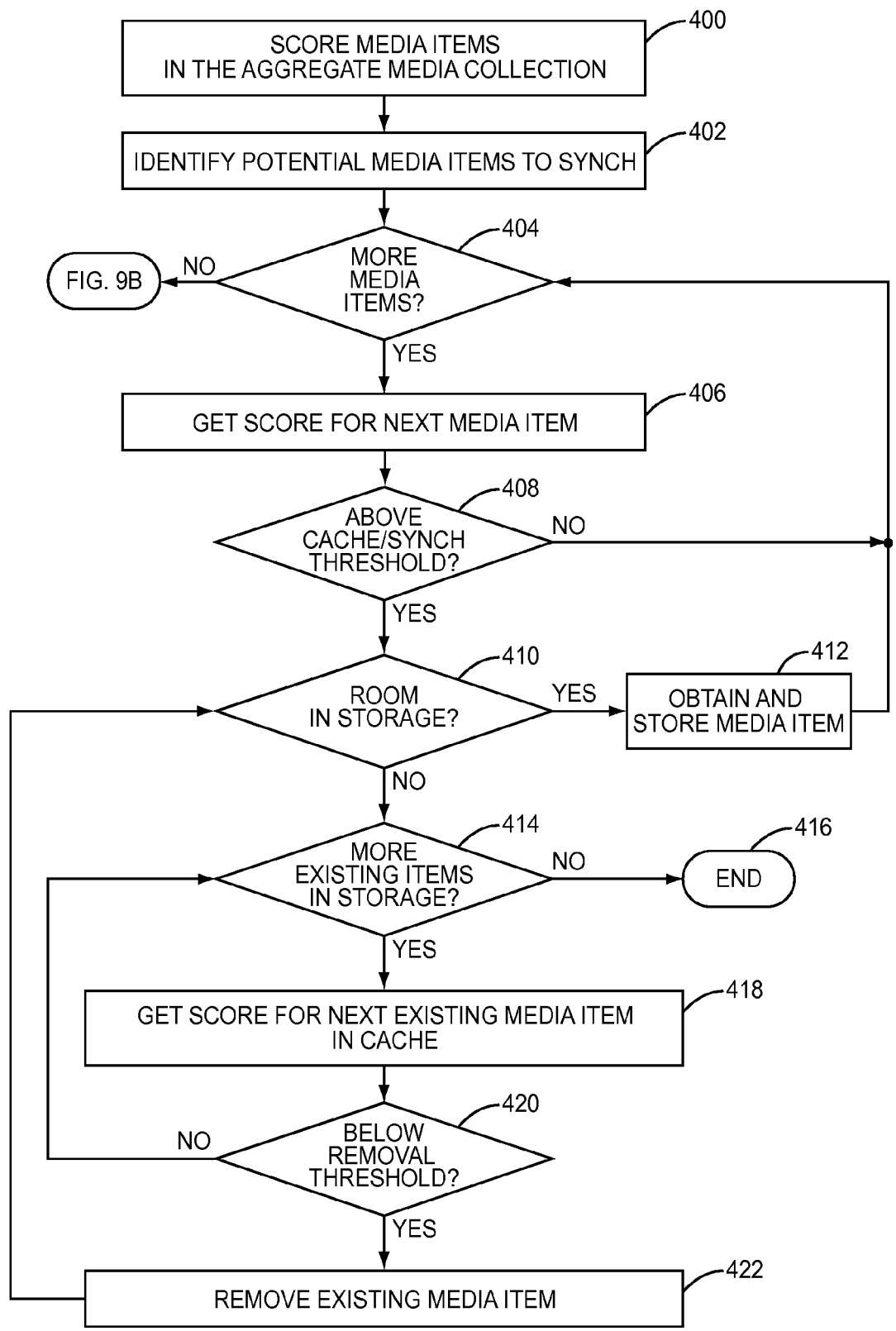
FIGS. 9A and 9B illustrates an auto caching and synching process according to one embodiment of the present invention.
Figure 9B:
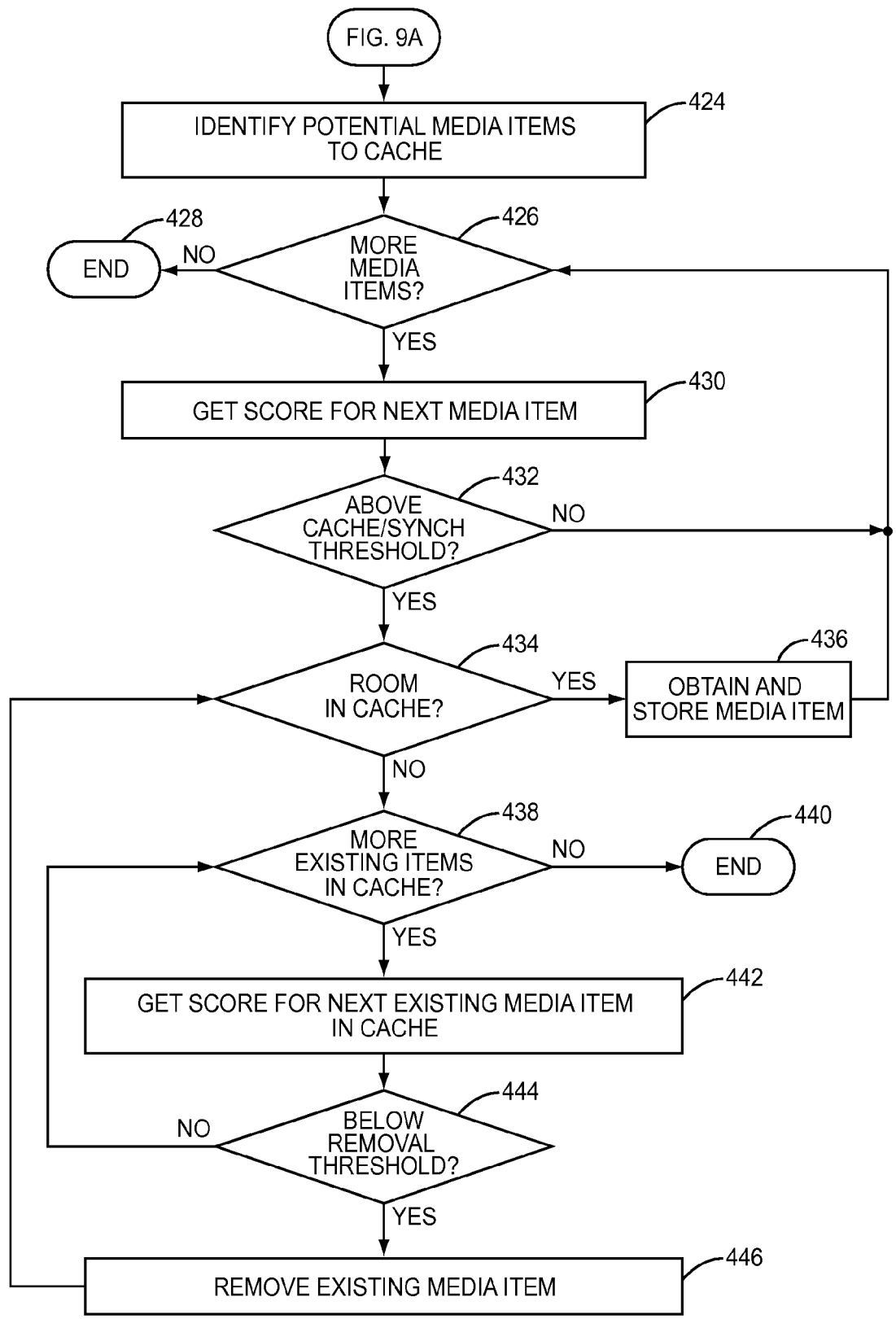

FIGS. 9A and 9B provide a flow chart illustrating a process for automatically synching and caching media items according to one embodiment of the present invention. First, the media items in the aggregate media collection 24-1 of the user 14-1 are scored (step 400). Note that, in this example, all of the media items in the aggregate media collection 24-1 of the user 14-1 are scored. However, the present invention is not limited thereto. For example, in an alternative embodiment, only media items in a currently selected playlist from the playlist selection area 36 (FIG. 3A) may be scored.

In the preferred embodiment, the media items are scored based on user preferences of the user 14-1. In one embodiment, the user preferences include weights assigned to a number of categories of media item attributes and weights assigned to a number of media item attributes for each category. Using songs as an example, the user preferences may include weights assigned to categories such as a genre category, a decade category, a source category, or the like. Then, for each category, weights may be assigned to a number of possible attributes for that category. For example, for the genre category, weights may be assigned to a number of genres such as Rock, Country, Jazz, or the like. Based on the user preferences and metadata describing attributes of the media items, the media items are scored. For a more detailed discussion of an exemplary scoring process, the interested reader is directed to U.S. Patent Application Publication No. 2008/0016205, entitled P2P NETWORK FOR PROVIDING REAL TIME MEDIA RECOMMENDATIONS, which was filed on Jul. 11, 2006, published on Jan. 17, 2008, and is hereby incorporated herein by reference in its entirety.

Next, potential media items to synch to the user device 12-1 are identified from the aggregate media collection 24-1 of the user 14-1 (step 402). More specifically, media items from one or more shared media collections owned by the user 14-1 and hosted by other user devices are identified as potential media items to synch. A determination is made as to whether there are more potential media items to synch to be processed (step 404). If not, the process proceeds step 424 to FIG. 9B. If there are more media items to be processed, the score for the next potential media item to synch is obtained (step 406), and a determination is made as to whether the score is above a cache/synch threshold (hereinafter "threshold") (step 408). If not, the process returns to step 404 and is repeated. If the score is above the threshold, a determination is made as to whether there is room to store the media item at the user device 12-1 (step 410). If so, the media item is obtained from the user device hosting the corresponding shared media collection and stored at the user device 12-1 (step 412). At this point, the process returns to step 404.

If there is not room to store the media item at the user device 12-1, a removal process is performed. Note that, in this embodiment, the cache 26-1 is a portion of a storage device of the user device 12-1 that may be used to cache shared media items. When additional storage is needed for synched media items or the local media collection 22-1, media items may be removed from the portion of the storage device used as the cache 26-1 in order to make room for additional synched media items or media items in the local media collection 22-1. More specifically, in this embodiment, a determination is made as to whether there are existing media items in the cache 26-1 of the user device 12-1 (step 414). If not, the process ends (step 416). If there are media items in the cache 26-1 of the user device 12-1, the score for the next existing media item in the cache 26-1 of the user device 12-1 is obtained (step 418), and a determination is made as to whether the score is below an auto-removal threshold (step 420). If not, the process returns to step 414 and is repeated. If the score is below the auto-removal threshold, the existing media item is removed from the cache 26-1 of the user device 12-1 (step 422), and the process returns to step 410 and is repeated.

Returning to step 404, once all of the potential media items to synch have been processed, the process proceeds to FIG. 9B. At this point, potential media items to cache are identified from the aggregate media collection (step 424). More specifically, the potential media items to cache are media items from the aggregate media collection 24-1 of the user 14-1 whose sources are shared media collections that are not owned by the user 14-1 and are hosted by other user devices. A determination is then made as to whether there are more potential media items to cache to be processed (step 426). If not, the process ends (step 428). If there are more media items to be processed, the score for the next potential media item to cache is obtained (step 430), and a determination is made as to whether the score is above the cache/synch threshold (hereinafter "threshold") (step 432). Note that in this example, the cache and synch thresholds are the same. However, the present invention is not limited thereto. If the score is not above the threshold, the process returns to step 426 and is repeated. If the score is above the threshold, a determination is made as to whether there is room for the media item in the cache 26-1 of the user device 12-1 (step 434). If so, the media item is obtained from the user device hosting the corresponding shared media collection and stored in the cache 26-1 of the user device 12-1 (step 436). At this point, the process returns to step 404.

If there is not room in the cache 26-1 of the user device 12-1 for the media item, a removal process is performed. More specifically, a determination is made as to whether there are more existing media items in the cache 26-1 of the user device 12-1 (step 438). If not, the process ends (step 440). If there are more media items in the cache 26-1 of the user device 12-1, the score for the next existing media item in the cache 26-1 of the user device 12-1 (step 442), and a determination is made as to whether the score is below the auto-removal threshold (step 444). In this example, the auto-removal threshold is the same for cached and synched media items. However, the present invention is not limited thereto. If the score is not below the auto-removal threshold, the process returns to step 438 and is repeated. If the score is below the auto-removal threshold, the existing media item is removed from the cache 26-1 of the user device 12-1 (step 446), and the process returns to step 434 and is repeated.

Figure 10:
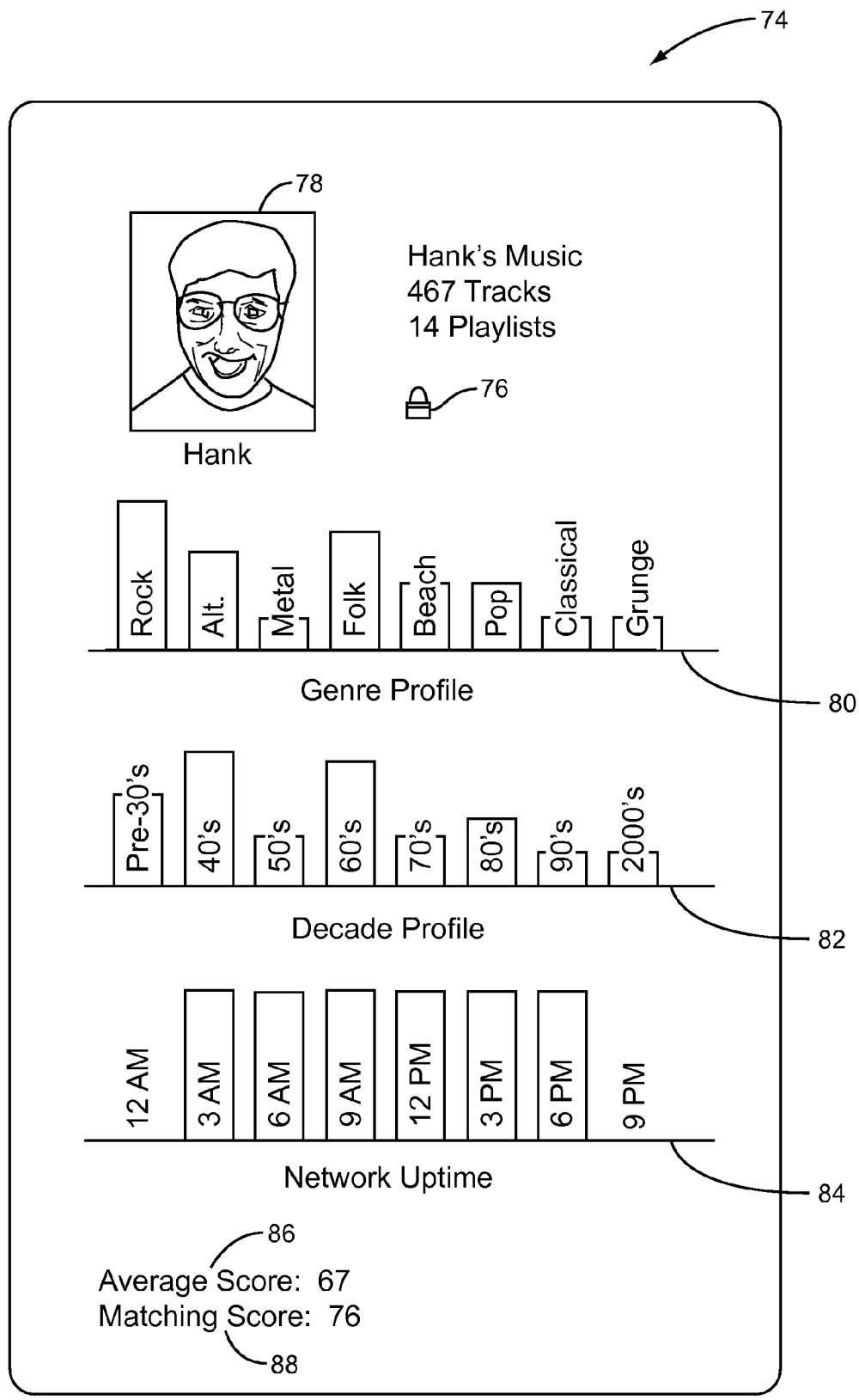
FIG. 10 illustrates a collection digest according to one embodiment of the present invention.
Figure 11:
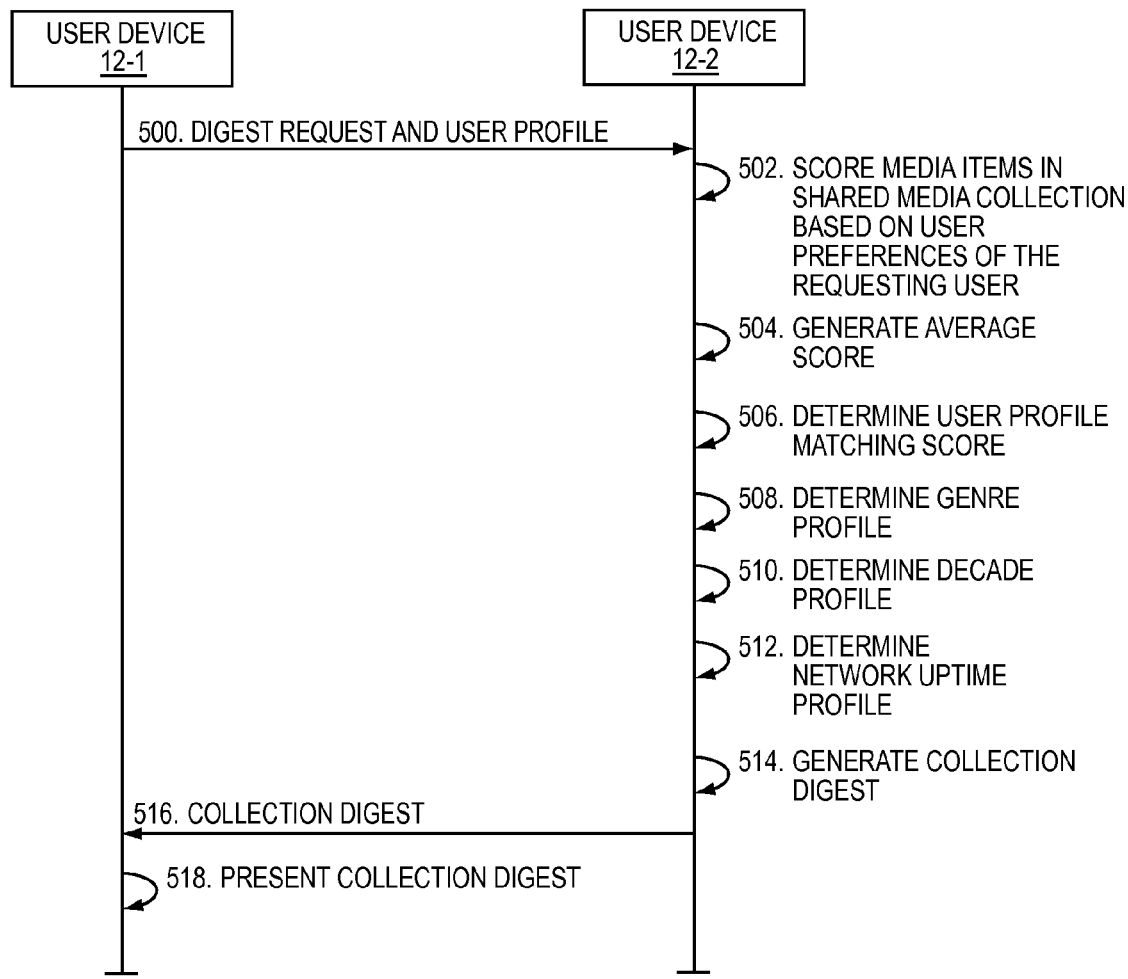
FIG. 11 illustrates a process for obtaining a collection digest according to one embodiment of the present invention.

FIGS. 10 and 11 illustrate another optional feature that may be provided in order to assist, for example, the user 14-1 in deciding which media collections to select for aggregation. More specifically, in this embodiment, the user 14-1 is enabled to view a collection digest for each of the media collections available for aggregation by, for example, clicking on or otherwise selecting the corresponding media collection identifiers in the GUI 28 (FIG. 3A). This feature is provided so that a receiving user can determine the desirability of a shared media collection prior to incurring the overhead of aggregation. This is especially desirable for shared media collections that are large.

FIG. 10 illustrates an exemplary collection digest 74 for the "Hank's Music" shared media collection. As illustrated, the collection digest 74 includes a name or identifier of the media collection; a total number of media items, which in this example are songs or tracks, in the shared media collection; a number of playlists in the shared media collection; an indicator 76 indicating that the shared media collection is password protected; an image 78 of the sharing user; a genre profile 80; a decade profile 82; a network uptime profile 84; an average score 86; and a matching score 88. The genre profile 80 is indicative of the number or percentage of media items in the shared media collection from each of a number of genres. Likewise, the decade profile 82 is indicative of the number or percentage of media items in the shared media collection released in each of a number of decades or time periods. The network uptime profile 84 is indicative of times of day during which the shared media collection has historically been available or shared. Note that the collection digest 74 is exemplary and not intended to limit the scope of the present invention. The collection digest 74 may include any type of information summarizing the shared media collection of the sharing user in a manner that assists the user 14-1 in deciding whether to select the shared media collection for aggregation. As discussed below, the average score 86 is an average score of media items in the "Hank's Music" shared media collection based on user preferences of the user 14-1. The matching score 88 is indicative of a degree to which a user profile of the user 14-1 matches a user profile of the user sharing the "Hank's Music" shared media collection.

FIG. 11 illustrates the operation of the media sharing system 10 to provide collection digests, such as the collection digest 74 of FIG. 10, according to one embodiment of the present invention. First, the aggregation function 20-1 of the user device 12-1 sends a request to a user device hosting an available shared media collection, which in this example is the user device 12-2 (step 500). The request may be provided automatically upon initially discovering the shared media collection hosted by the user device 12-2. Alternatively, the request may be provided to the user device 12-2 in response to user input from the user 14-1 at the user device 12-1. In this embodiment, a user profile of the user 14-1 is provided to the user device 12-2 as part of the request or in association with the request. In this example, the user profile of the user 14-1 includes the user preferences of the user 14-1 used to score media items for the user 14-1 as well as information describing the user 14-1 and/or the shared media collection of the user 14-1. The information describing the user 14-1 may include demographic information such as, for example, age, gender, geographic location, or the like. The information describing the shared media collection of the user 14-1 may include, for example, a genre profile, a decade profile, a network uptime profile, or the like.

The aggregation function 20-2 of the user device 12-2 then scores the media items in the shared media collection hosted by the user device 12-2 based on the user preferences of the user 14-1 (step 502). In this example, the aggregation function 20-2 of the user device 12-2 then averages the scores of the media items generated in step 502 to provide an average score (step 504). The aggregation function 20-2 of the user device 12-2 also compares the user profile of the user 14-1 and the user profile of the user 14-2 to provide a matching score indicative of a degree to which the user profile of the user 14-1 matches the user profile of the user 14-2 (step 506). Note that any known user profile matching technique may be used. In this example, the shared media collection is a shared music collection. As such, the aggregation function 20-2 of the user device 12-2 also generates a genre profile and a decade profile for the shared media collection of the user device 12-2 (steps 508 and 510). The aggregation function 20-2 of the user device 12-2 also determines or generates a network uptime profile for the shared media collection that is indicative of whether the shared media collection has historically been available for each of a number of periods of time during the day (step 512).

The aggregation function 20-2 of the user device 12-2 then generates a collection digest for the shared media collection hosted by the user device 12-2 (step 514). In this exemplary embodiment, the collection digest includes the average score of the media items in the shared media collection based on the user preferences of the user 14-1, the user profile matching score, the genre profile, the decade profile, and the network uptime profile. In addition, the collection digest may include the number of media items in the shared media collection, an identifier of the shared media collection, an image of the sharing user 14-2, an indication as to whether the shared media collection is password protected, or the like.

The aggregation function 20-2 of the user device 12-2 then returns the collection digest to the user device 12-1 (step 516). The aggregation function 20-1 of the user device 12-1 then presents the collection digest to the user 14-1 (step 518).

More specifically, if the request for the collection digest was initiated by the user 14-1, then the collection digest may automatically be presented to the user 14-1. If the request for the collection digest was initiated automatically in response to, for example, discovering the shared media collection hosted by the user device 12-2, then the collection digest may be stored and presented to the user 14-1 upon request. For example, the collection digest may be presented when the user 14-1 causes a pointing device (e.g., mouse cursor) to hover over the identifier of the shared media collection in the GUI 28 (FIG. 3A). Note that while FIG. 11 only illustrates a process for the user device 12-1 obtaining a collection digest of a single shared media collection, the same process may be used by all of the user devices 12-1 through 12-N to obtain collection digests for available shared media collections.

FIGS. 10 and 11 are exemplary. In another embodiment, the user device 12-1 may provide one or more pre-filtering criteria to the user device 12-2 to be applied with respect to the generating of the collection digest for the shared media collection hosted by the user device 12-2. For example, the pre-filtering criteria may state that the media items in the shared media collection hosted by the user device 12-2 are to be scored based on the user preferences of the user 14-1 of the user device 12-1 and that the collection digest for the shared media collection hosted by the user device 12-2 is to include information identifying the five highest scored media items from the shared media collection hosted by the user device 12-2 and their scores. As another example, the pre-filtering criteria may be criteria used to filter the shared media collection hosted by the user device 12-2. For instance, the criteria may be one or more preferred genres, one or more preferred time periods, or the like. The media items in the filtered shared media collection may then be scored based on the user preferences of the user 14-1 of the user device 12-1, and an average of those scores may be determined and included in the collection digest.

Figure 13:
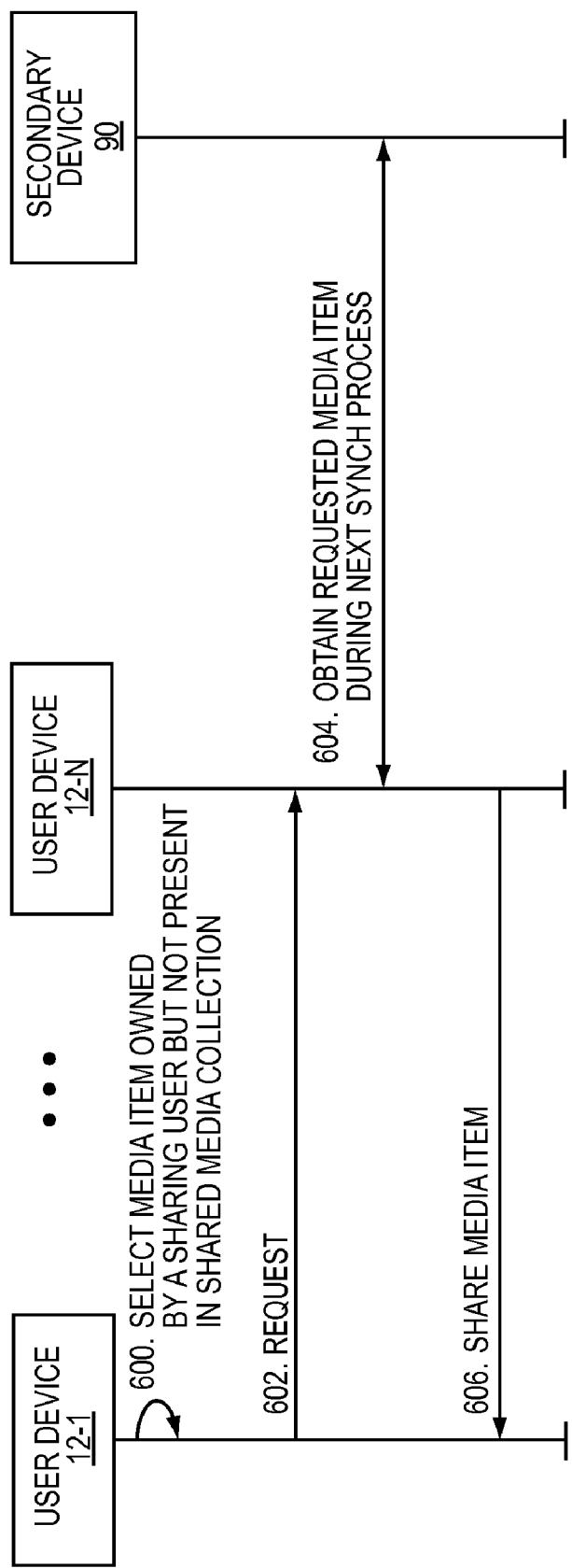
FIG. 13 illustrates a bridging process according to one embodiment of the present invention.

FIGS. 12 and 13 illustrate a bridging feature according to another embodiment of the present invention. Using the user device 12-N as an example, the local media collection 22-N of the user device 12-N may include media items owned by the user 14-N and stored locally at the user device 12-N. In addition, the local media collection 22-N may include information, or fingerprints, identifying media items owned by the user 14-N but stored remotely on a secondary device. For example, the user device 12-N may be a mobile device such as an Apple® iPhone® and the secondary device may be a personal computer of the user 14-N. As such, if the user 14-1 selects the shared media collection hosted by the user device 12-N for aggregation, the aggregate media collection 24-1 of the user 14-1 may include media items from the shared media collection of the user 14-N that are not stored on the user device 12-N. As such, FIGS. 12 and 13 describe a process by which the user device 12-1 may request that the user device 12-N operate as a bridge for media items from the shared media collection of the user device 12-N that are not stored on the user device 12-N but are instead stored on a secondary device of the user 14-N.

FIG. 12 illustrates on exemplary embodiment of how the user 14-1 can select a media item to be obtained via a bridging process. In this example, the song "You Get What You Give" is from the shared media collection identified by the source indicator "D," which corresponds to the "Jeannette's Music" shared media collection (FIG. 3B). Note that the exclamation point "!" beside the "D" in the source indicator indicates that the song "You Get What You Give" is from the shared media collection "Jeannette's Music" but is not currently stored on the corresponding user device. By selecting the song "You Get What You Give" for caching, the user 14-1 initiates a bridging process by which the song "You Get What You Give" will be obtained and cached by the user device 12-1. Note that the bridging process may be initiated in other manners and is not limited to the example of FIG. 12.

FIG. 13 illustrates an exemplary bridging process. First, a media item included in the shared media collection of the user device 12-N that is owned by the user 14-N but not currently stored on the user device 12-N is selected (step 600). Continuing the example of FIG. 12, assume that the song "You Get What You Give" from the shared media collection hosted by the user device 12-N is selected. Again, the selection of the media item may be, for example, the selection of the song for caching either manually, via an automatic caching process, or the like. However, the present invention is not limited thereto. The aggregation function 20-1, or the media player function 18-1, of the user device 12-1 then sends a request for the selected media item, which in this example is the song "You Get What You Give," to the user device 12-N (step 602). Since the selected media item is not currently stored on the user device 12-N, the aggregation function 20-N, or the media player function 18-N, of the user device 12-N identifies the selected media item as a media item to obtain from a secondary device 90 of the user 14-N on which the selected media item is stored.

Thereafter, during a subsequent synchronization process between the user device 12-N and the secondary device 90, the user device 12-N obtains the selected media item from the secondary device 90 (step 604). Note that the secondary device 90 may be one of the other user devices 12-2 through 12-N-1 (not shown) such that the synchronization process is performed the manner discussed above with respect to FIGS. 7, 8A through 8C, 9A, and 9B. Alternatively, the secondary device 90 may not be one of the other user devices 12-2 through 12-N-1, in which case the synchronization process may be a typical synchronization process performed via a direct wired connection (e.g., Universal Serial Bus, Firewire, or the like) or a direct local wireless connection (e.g., IEEE 802.11x, Bluetooth, or the like). For example, if the user device 12-N is an Apple® iPhone®, the synchronization process may be a traditional synchronization process between the Apple® iPhone® and the secondary device 90 (e.g., a personal computer). Once the selected media item is obtained by the user device 12-N, the aggregation function 20-N of the user device 12-N shares the selected media item with the user device 12-1 (step 606). For example, if the selected media item is selected for caching, the aggregation function 20-N of the user device 12-N may push the selected media item to the user device 12-1 for caching. As another example, the aggregation function 20-N of the user device 12-N may notify the user device 12-1 that the selected media item is not available and provide the selected media item to the user device 12-1 upon request.

As an exemplary use case of the bridging process, the user devices 12-1 and 12-N may participate in the media sharing system 10 at a work environment of the users 14-1 and 14-N. While interacting over the LAN 16 in their work environment, the song "You Get What You Give" is selected, and the user device 12-1 sends a request for the song "You Get What You Give" to the user device 12-N. That evening, while the user 14-N and the user device 12-N are in a home environment of the user 14-N in which the secondary device 90 is located, the user device 12-N obtains the song "You Get What You Give" from the secondary device 90 during a synchronization process. The next day when the users 14-1 and 14-N, along with their respective user devices 12-1 and 12-N, are back in their work environment, the song "You Get What You Give" is stored on the user device 12-N and available for sharing with the user 14-1 at the user device 12-1.

Figure 14A:
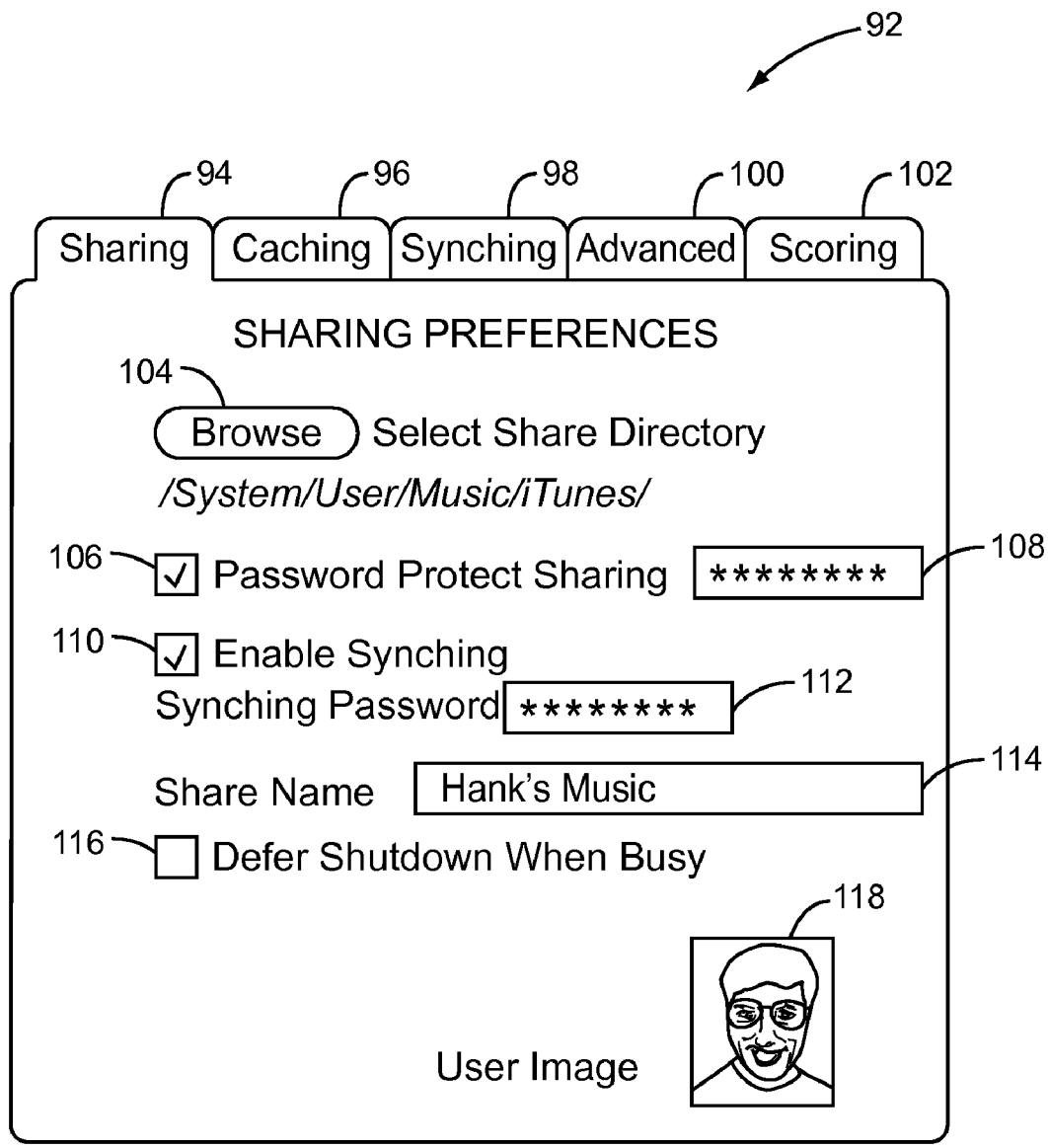
FIGS. 14A through 14E illustrate an exemplary GUI enabling a user to configure his media player and aggregation function as well as to define preferences utilized by the media player and/or aggregation function according to one embodiment of the present invention.

FIGS. 14A through 14E illustrate an exemplary GUI 92 enabling, for example, the user 14-1 to configure his media player function 18-1 as well as to define a number of user preferences according to one embodiment of the present invention. As illustrated in FIG. 14A, the GUI 92 includes a number of tabs, which include a sharing tab 94, a caching tab 96, a synching tab 98, an advanced tab 100, and a scoring tab 102. In FIG. 14A, the sharing tab 94 is selected. As such, the user 14-1 is enabled to define a number of sharing preferences. More specifically, in this example, via a browse button 104, the user 14-1 is enabled to select a directory in which his shared media collection is located. By selecting a check box 106 and entering a password in password field 108, the user 14-1 activates password protection for his shared media collection. The other users 14-2 through 14-N are required to enter the password before accessing the shared media collection of the user 14-1. The other users 14-2 through 14-N may be required to enter the password before aggregation is performed. Alternatively, the other users 14-2 through 14-N may be enabled to select the shared media collection of the user 14-1 for aggregation but may be required to enter the password once before accessing media items from the shared media collection for playback.

The user 14-1 may also enable synching by selecting check box 110 and entering a synching password in synching password field 112. By enabling synching, the user 14-1 enables other user devices of the user devices 12-2 through 12-N to obtain media items from the user device 12-1 using the synching process discussed above with respect to FIGS. 7, 8A through 8C, 9A, and 9B. In this example, the sharing preferences also include a share name, which is entered in a share name field 114. In addition, by selecting check box 116, the user 14-1 may choose to defer shutdown of the media player function 18-1 when the media player function 18-1 is busy delivering media items from the shared media collection to one or more of the other user devices 12-2 through 12-N. Lastly, the sharing preferences include an image 118 of the user 14-1.

Figure 14B:
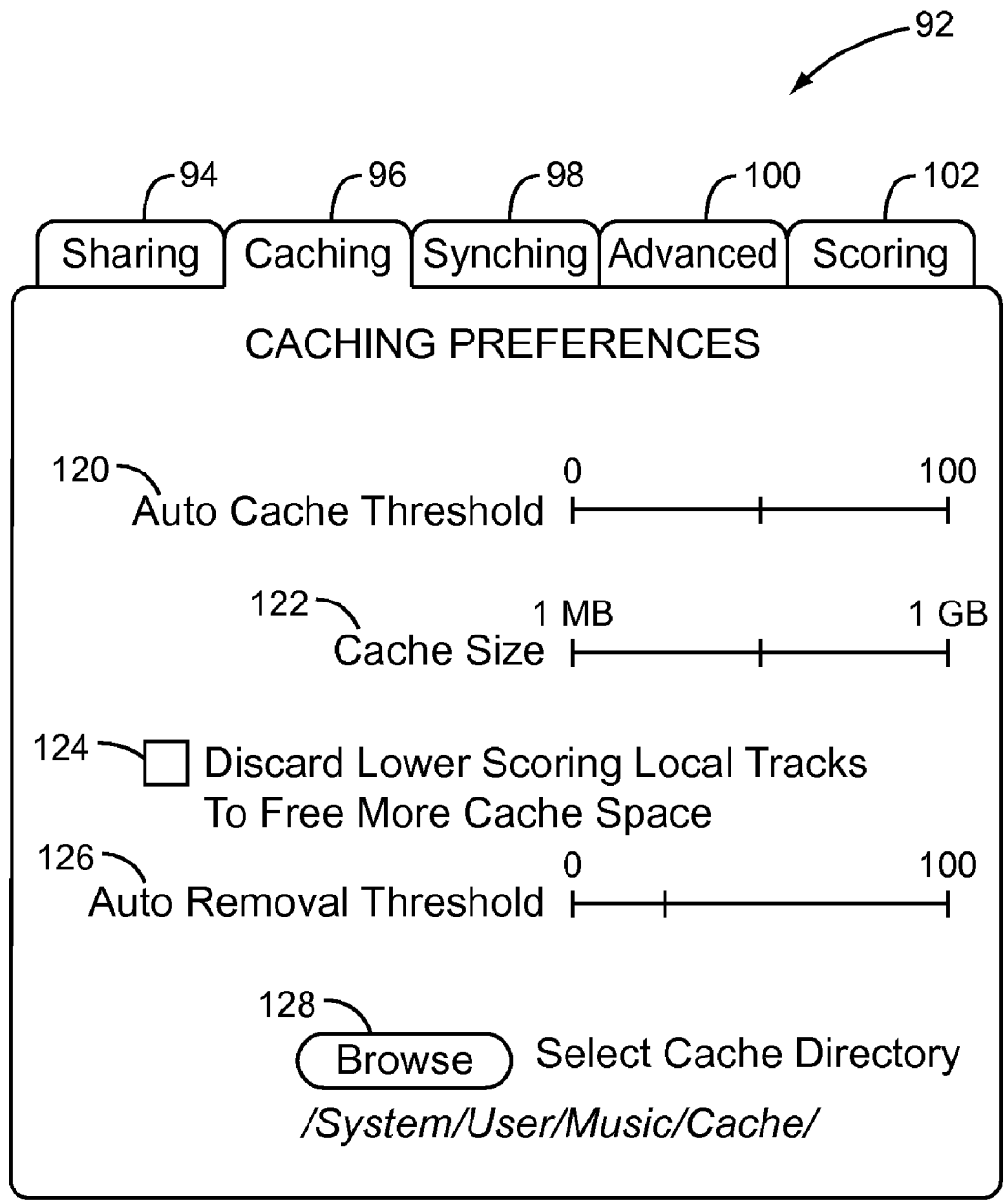

In FIG. 14B, the caching tab 96 is selected. As such, the user 14-1 is enabled to define a number of caching preferences. In this example, the caching preferences include an auto-cache threshold 120. As discussed above, using the auto-caching/synching process of FIG. 9, the media items scored above the auto-cache threshold 120 are automatically cached. In this example, the auto-cache threshold 120 is also used as the auto-synching threshold. The caching preferences also include a cache size 122. The cache size 122 defines the size of the cache 26-1 used for storing cached media items. The user 14-1 may enable automatic removal of cached media items by selecting check box 124 and defining an auto-removal threshold 126. Lastly, the user 14-1 may define a cache directory via a browse button 128.

Figure 14C:
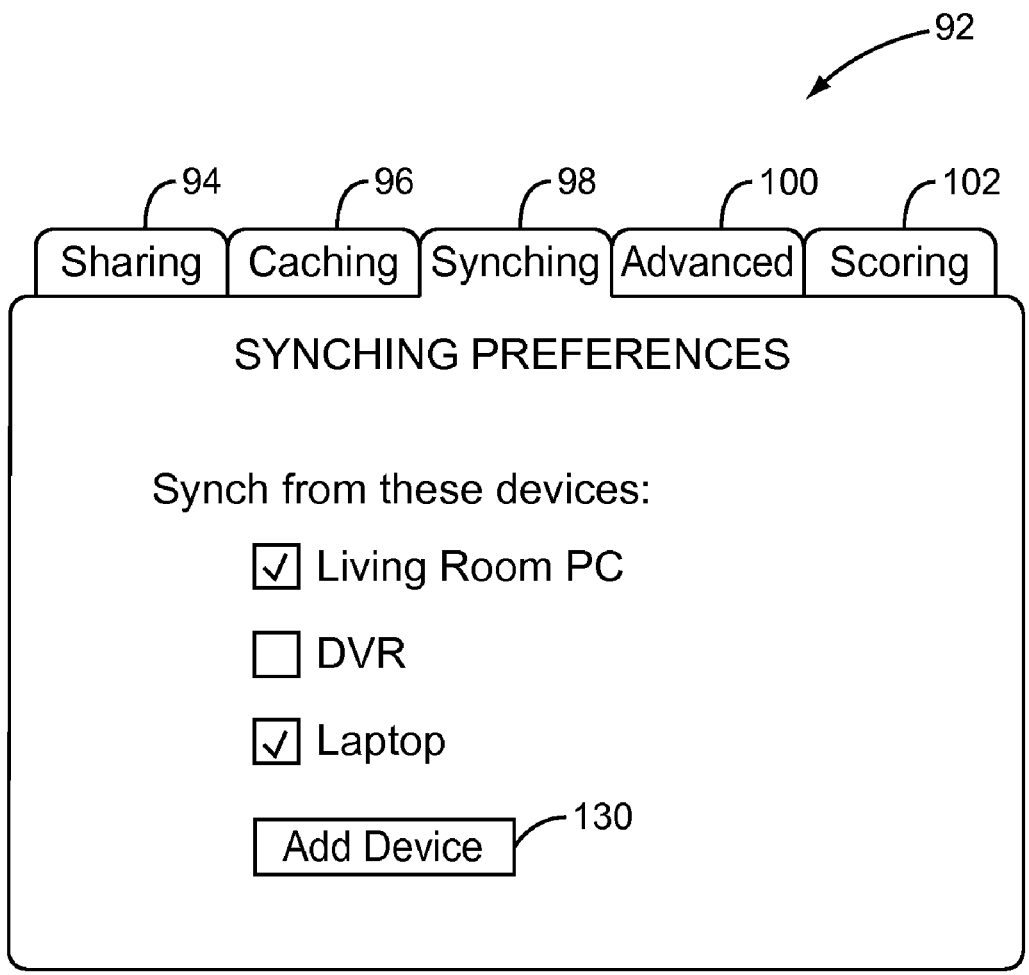

In FIG. 14C, the synching tab 98 is selected. As such, the user 14-1 is enabled to define a number of synching preferences. In this example, the synching preferences include a list of user devices from which the user device 12-1 is to synch. In this example, the list of user devices from which the user device 12-1 is to synch includes user devices referenced as "Living Room PC" and "Laptop." However, rather than referring to the user devices, the shared media collection identifiers may be used. When the shared media collections of the "Living Room PC" and the "Laptop" are available, in the preferred embodiment, the shared media collections appear as available shared media collections in the GUI 28. The user 14-1 may then choose to select these shared media collections for aggregation if desired. Once selected, the user 14-1 enters the required synching passwords for those devices. Then, the synching process described above with respect to FIGS. 7, 8A through 8C, 9A, and 9B may be used to synch desired media items from the selected devices to the user device 12-1. The user 14-1 may add a new device with which to synch via an add device button 130. For example, upon selecting the add device button 130, the user 14-1 may be presented with a list of devices currently available via the LAN 16 (FIG. 1). The user 14-1 may then select one or more of the devices for synching.

Figure 14D:
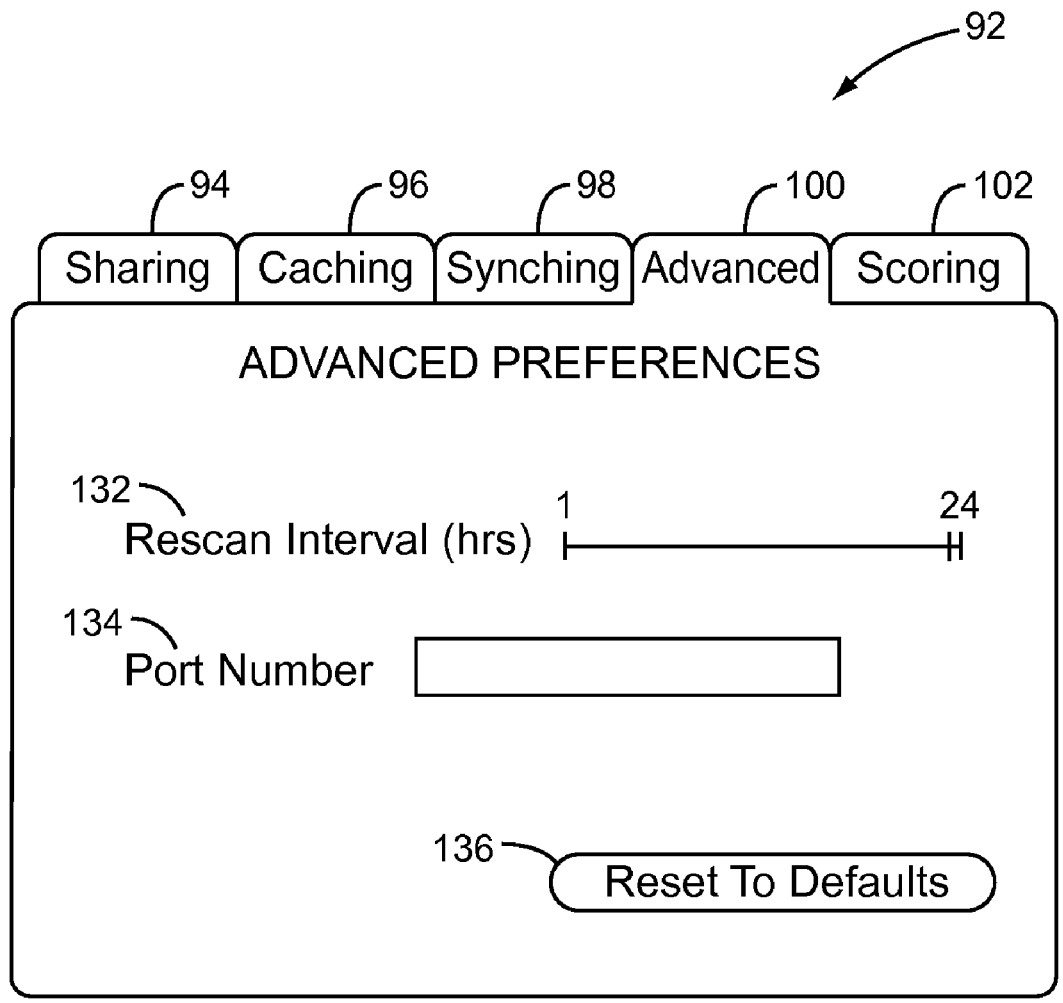

In FIG. 14D, the advanced tab 100 is selected. As such, the user 14-1 is enabled to define a number of advanced preferences. In this example, the advanced preferences include a rescan interval 132 and a port number 134. The rescan interval 132 defines a number of hours between scans by the aggregation function 20-1 for new shared media collections or updates to existing shared media collections. The port number 134 defines the port used by the media player function 18-1. A reset button 136 may be activated by the user 14-1 to reset the rescan interval 132 and port number 134 to default values.

Figure 14E:
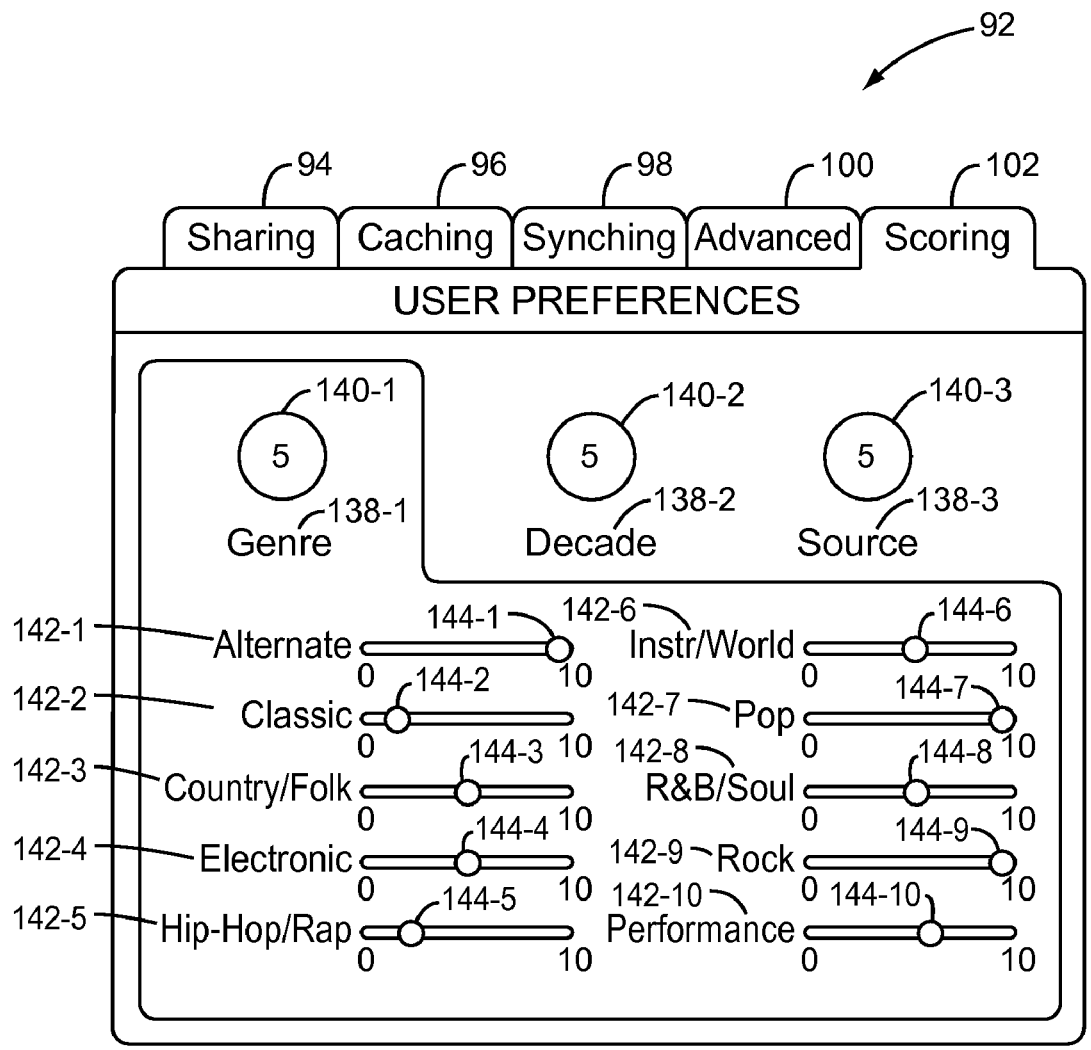

In FIG. 14E, the scoring tab 102 is selected. As such, the user 14-1 is enabled to define a number of user preferences used for scoring media items as discussed above. In this example, the user preferences include a number of media item categories 138-1 through 138-3. The user 14-1 assigns weights to the corresponding media item categories via associated controls 140-1 through 140-3. In addition, for each of the media item categories 138-1 through 138-3, the user 14-1 assigns weights to a number of media item attributes. Thus, in this example, for the genre category 138-1, the user 14-1 assigns weights to a number of genres 142-1 through 142-10 via associated controls 146-1 through 146-10. In a similar manner, the user 14-1 assigns weights to a number of attributes for each of the other media item categories 138-2 through 138-3. More specifically, for the decade category 138-2, the user 14-1 assigns weights to a number of decades. For the source category 138-3, the user 14-1 assigns weights to a number of known sources, which include the currently available shared media collections and, optionally, previously shared media collections. Alternatively, the sources may be referred to by device or user identifiers rather than shared media collection identifiers.

Note that in addition to the preferences and settings discussed with respect to FIGS. 14A through 14E and elsewhere in this disclosure, additional settings may be system-defined or user-defined. More specifically, a maximum number of outgoing connections, a maximum number of incoming connections, a maximum time in cache, a maximum number of playbacks for a cached media item, a setting defining whether cached media items are to be removed upon restart, or the like may be defined. These additional settings may be system-defined and, optionally, configurable by an operator of the media sharing system 10. Further, if system-defined, these additional settings may be global in that they are applied to all of the user devices 12-1 through 12-N or independently defined for each of the user devices 12-1 through 12-N. Alternatively, these additional settings may be defined by the users 14-1 through 14-N. As yet another alternative, some of these additional settings may be system-defined while others are user-defined.

Figure 15:
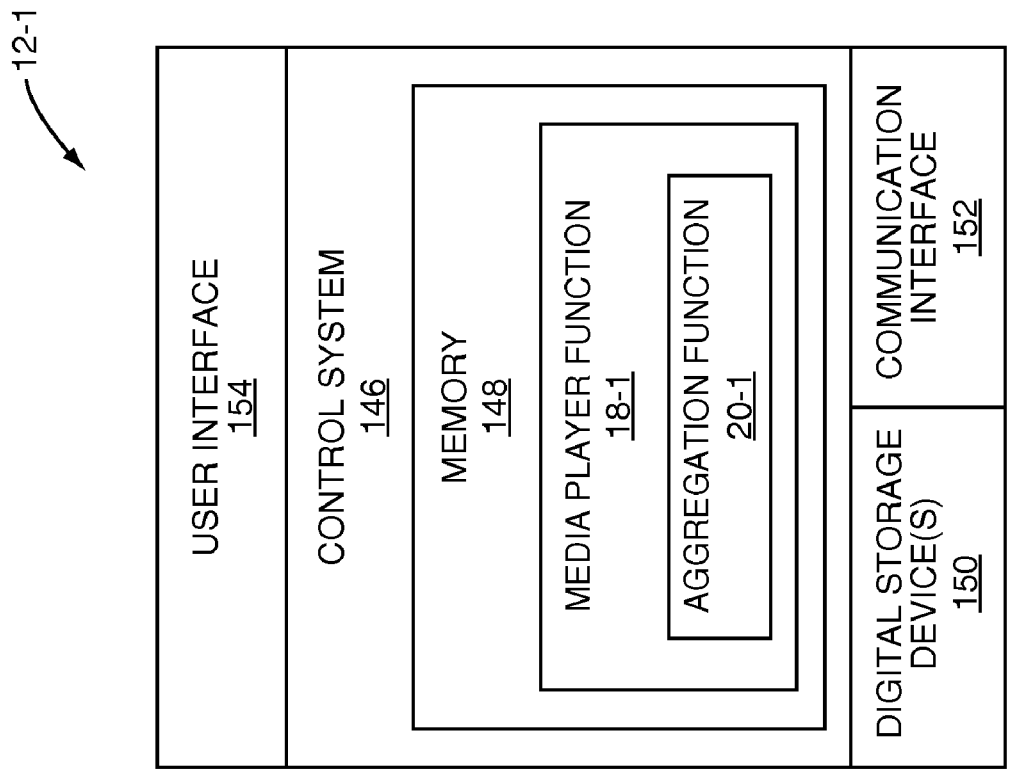
FIG. 15 is a block diagram of an exemplary embodiment of one of the user devices of FIG. 1.

FIG. 15 is a block diagram of an exemplary embodiment of the user device 12-1 of FIG. 1. This discussion is equally applicable to the other user devices 12-2 through 12-N. In general, the user device 12-1 includes a control system 146 having associated memory 148. In this example, the media player function 18-1, including the aggregation function 20-1, is implemented in software and stored in the memory 148. However, the present invention is not limited thereto. The media player function 18-1, including the aggregation function 20-1, may be implemented in software, hardware, or a combination thereof. The user device 12-1 also includes one or more digital storage devices 150 such as, for example, one or more hard disk drives or the like. In one embodiment, the local media collection 22-1 and the aggregate media collection 24-1 are stored in the one or more digital storage devices 150. In addition, some amount of the storage capacity of the one or more digital storage devices 150 may be allocated or used as the cache 26-1. However, the present invention is not limited thereto. The user device 12-1 also includes a communication interface 152 communicatively coupling the user device 12-1 to the LAN 16. The communication interface 152 may be a wired or wireless connection. For example, the communication interface 152 may be an Ethernet connection, an IEEE 802.11x connection, or the like. The communication interface 152 or a second wired or wireless communication interface may be used to connect to a secondary device for a typical synchronization process, as discussed above. The user device 12-1 also includes a user interface 154, which may include components such as, but not limited to, one or more user input devices, a display, a speaker, or the like.

Those skilled in the art will recognize improvements and modifications to the preferred embodiments of the present invention. All such improvements and modifications are considered within the scope of the concepts disclosed herein and the claims that follow.

What is claimed is:

1. A method comprising:
presenting a plurality of identifiers to a user identifying a corresponding plurality of media collections to be aggregated for an aggregate media collection of the user, the plurality of media collections comprising one or more shared media collections shared by corresponding one or more sharing users;
assigning a unique source indicator to each of the plurality of media collections to be aggregated;
aggregating the plurality of media collections to provide the aggregate media collection of the user; and
presenting a source indicator in association with at least one element of the aggregate media collection of the user, the source indicator corresponding to the unique source indicator for one of the plurality of media collections that is a source for the at least one element of the aggregate media collection;
wherein the unique source indicator of each of the plurality of media collections and the source indicator presented in association with the at least one element of the aggregate media collection are visual indicators; and
wherein the at least one element comprises a plurality of media items from the aggregate media collection of the user, and presenting the source indicator in association with the at least one element of the aggregate media collection of the user comprises: for each media item of the plurality of media items from the aggregate media collection of the user, presenting a source indicator in association with an identifier of the media item corresponding to the unique source indicator of one of the plurality of media collections that is a source from which the media item is to be obtained.

2. The method of claim 1 wherein the at least one element further comprises a currently playing media item, and presenting the source indicator further comprises presenting a source indicator in association with a playback progress bar.

3. The method of claim 2 wherein presenting the source indicator in association with the playback progress bar comprises presenting the source indicator as a thumb of the playback progress bar.

4. The method of claim 1 wherein the at least one element further comprises a playlist including a plurality of media items from the aggregate media collection, and presenting the source indicator in association with the at least one element of the aggregate media collection of the user further comprises:
presenting one or more source indicators in association with an identifier of the playlist, each source indicator of the one or more source indicators corresponding to the unique source indicator of one of the plurality of media collections that is a source of at least one of the plurality of media items in the playlist.

5. The method of claim 1 wherein the plurality of media collections comprise the one or more shared media collections shared by the one or more sharing users and a media collection of the user.

6. The method of claim 1 wherein the aggregate media collection comprises a list of unique media items in the plurality of media collections and, for each unique media item in the list of unique media items, information identifying at least one of the plurality of media collections as a source of the unique media item.

7. The method of claim 1 wherein media items from the one or more shared media collections are streamed to a user device of the user for playback as desired.

8. The method of claim 1 wherein the method is a method of operation of a user device of the user, and the one or more shared media collections are hosted by corresponding one or more user devices of the one or more sharing users connected to the user device of the user via a network.

9. A non-transitory computer readable medium comprising software stored therein, executable by one or more computing processors, for instructing a computing system to:
present a plurality of identifiers to a user identifying a corresponding plurality of media collections to be aggregated to provide an aggregate media collection of the user, the plurality of media collections comprising one or more shared media collections shared by corresponding one or more sharing users;
assign a unique source indicator to each of the plurality of media collections to be aggregated to provide the aggregate media collection of the user;
aggregate the plurality of media collections to provide the aggregate media collection of the user; and
present a source indicator in association with at least one element of the aggregate media collection of the user, the source indicator corresponding to the unique source indicator for one of the plurality of media collections that is a source for the at least one element of the aggregate media collection;
wherein the unique source indicator of each of the plurality of media collections and the source indicator presented in association with the at least one element of the aggregate media collection are visual indicators; and
wherein the at least one element comprises a plurality of media items from the aggregate media collection of the user, and the software is further adapted to instruct the computing system to: for each media item of the plurality of media items from the aggregate media collection of the user, present a source indicator in association with an identifier of the media item corresponding to the unique source indicator of one of the plurality of media collections that is a source from which the media item is to be obtained.

10. The non-transitory computer readable medium of claim 9 wherein the at least one element further comprises a currently playing media item, and the source indicator presented in association with the at least one element comprises a source indicator presented in association with a playback progress bar that corresponds to the unique source indicator of one of the plurality of media collections that is a source from which the currently playing media item is to be obtained.

11. The non-transitory computer readable medium of claim 10 wherein the source indicator presented in association with the playback progress bar is presented as a thumb of the playback progress bar.

12. The non-transitory computer readable medium of claim 9 wherein the at least one element further comprises a playlist including a plurality of media items from the aggregate media collection, and the software is further adapted to instruct the computing system to:
  present one or more source indicators in association with an identifier of the playlist, each source indicator of the one or more source indicators corresponding to the unique source indicator of one of the plurality of media collections that is a source of at least one of the plurality of media items in the playlist.

13. The non-transitory computer readable medium of claim 9 wherein the plurality of media collections comprise the one or more shared media collections shared by the one or more sharing users and a media collection of the user.

14. The non-transitory computer readable medium of claim 9 wherein the aggregate media collection comprises a list of unique media items in the plurality of media collections and, for each unique media item in the list of unique media items, information identifying at least one of the plurality of media items as a source of the unique media item.

15. The non-transitory computer readable medium of claim 9 wherein the computing system is a user device of the user, and media items from the one or more shared media collections are streamed to the user device of the user for playback as desired.

16. The non-transitory computer readable medium of claim 9 wherein the computing system is a user device of the user, and the one or more shared media collections are hosted by corresponding one or more user devices of the one or more sharing users connected to the user device of the user via a network.

17. A user device of a user comprising:
a communication interface communicatively coupling the user device to a network; and
a control system associated with the communication interface and adapted to:
  join a media sharing system comprising the user device of the user and one or more user devices of one or more sharing users connected via the network, the one or more user devices of the one or more sharing users hosting a corresponding one or more shared media collections;
  present a plurality of identifiers to the user identifying a corresponding plurality of media collections to be aggregated to provide an aggregate media collection of the user, the plurality of media collections comprising the one or more shared media collections;
  assign a unique source indicator to each of the plurality of media collections to be aggregated to provide the aggregate media collection of the user;
  aggregate the plurality of media collections to provide the aggregate media collection of the user; and
  present a source indicator in association with at least one element of the aggregate media collection of the user, the source indicator corresponding to the unique source indicator for one of the plurality of media collections that is a source for the at least one element of the aggregate media collection;
wherein the unique source indicator of each of the plurality of media collections and the source indicator presented in association with the at least one element of the aggregate media collection are visual indicators; and
wherein the at least one element comprises a plurality of media items from the aggregate media collection of the user, and in order to present the source indicator in association with the at least one element of the aggregate media collection of the user, the control system is further adapted to: for each media item of the plurality of media items from the aggregate media collection of the user, present a source indicator in association with an identifier of the media item corresponding to the unique source indicator of one of the plurality of media collections that is a source from which the media item is to be obtained.

* * * * *